Sept. 11, 1956 F. E. ULLERY 2,762,196
HYDRODYNAMIC TORQUE CONVERTER
Filed Nov. 7, 1951 5 Sheets-Sheet 1
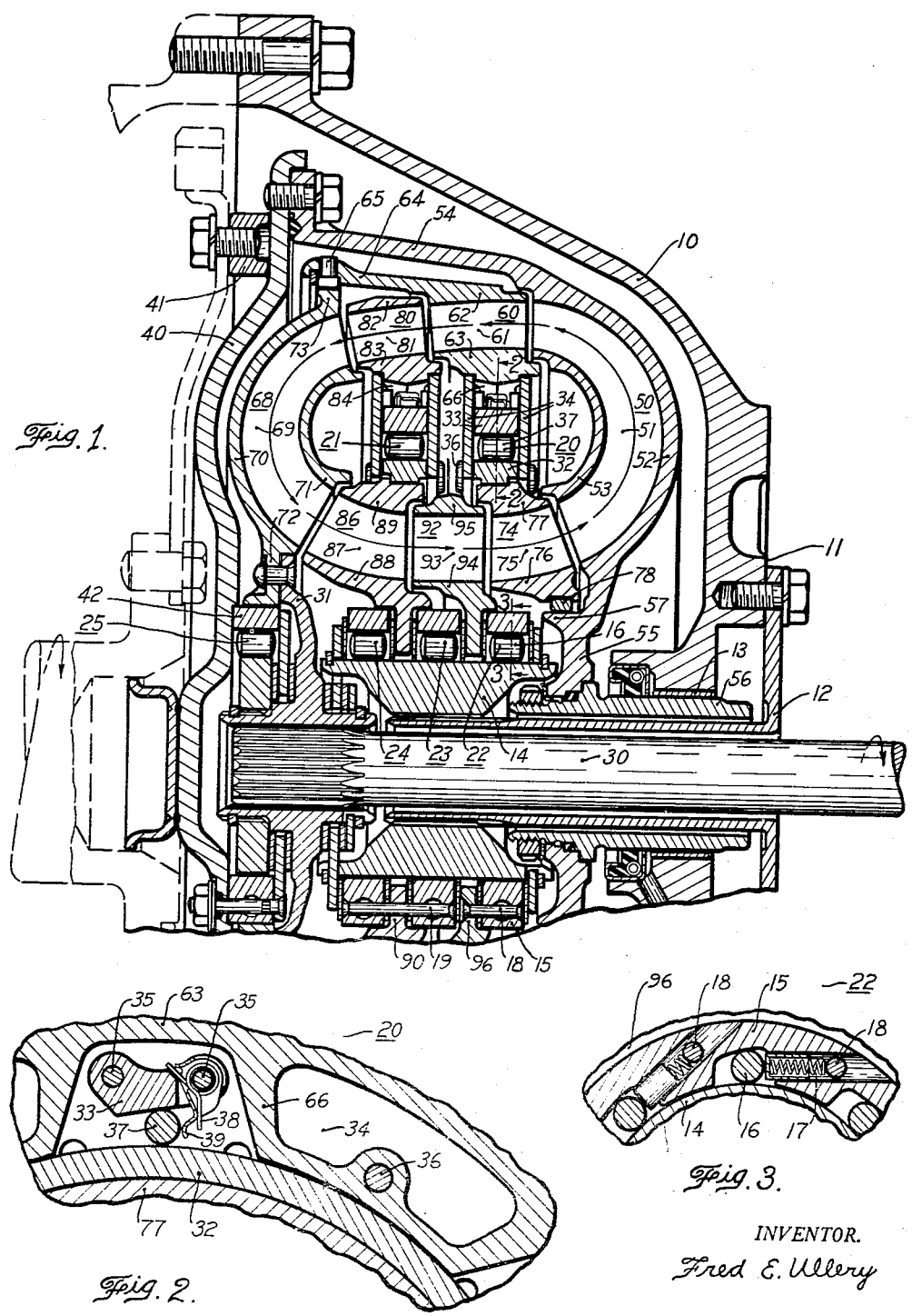
INVENTOR.
Fred E. Ullery INVENTOR.
Fred E. Ullery Sept. 11, 1956  F. E. ULLERY  2,762,196
HYDRODYNAMIC TORQUE CONVERTER
Filed Nov. 7, 1951  5 Sheets-Sheet 3
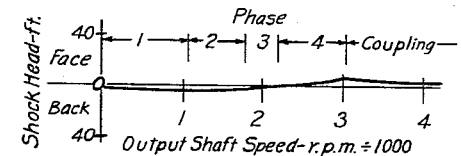
Fig. 8. PUMP ENTRANCE.
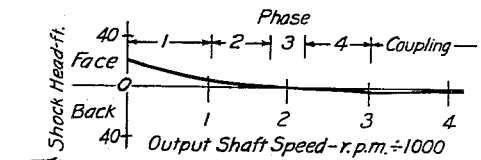
Fig. 9. FIRST TURBINE ENTRANCE.
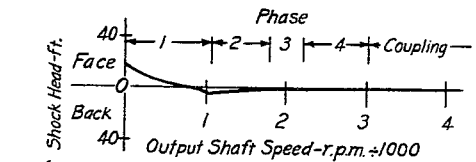
Fig. 10. SECOND TURBINE ENTRANCE.
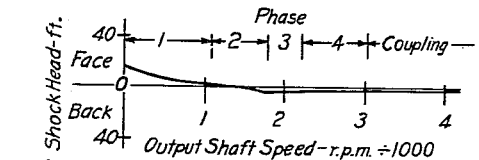
Fig. 11. THIRD TURBINE ENTRANCE.
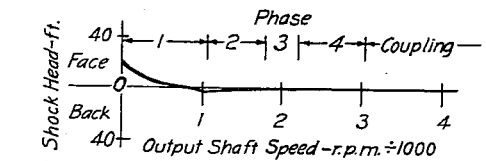
Fig. 12. FIRST STATOR ENTRANCE.
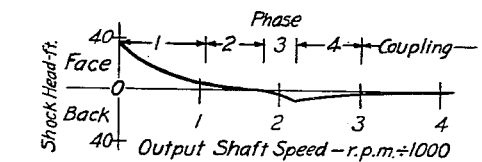
Fig. 13. SECOND STATOR ENTRANCE.
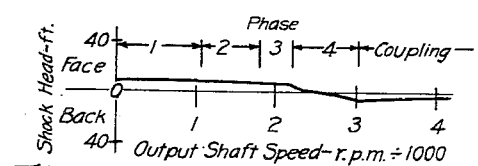
Fig. 14. THIRD STATOR ENTRANCE.
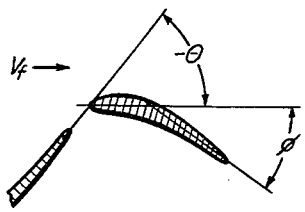
Fig. 15.
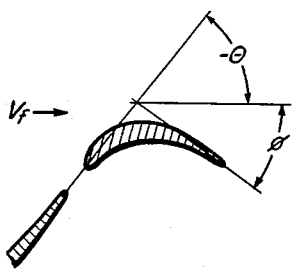
Fig. 16.
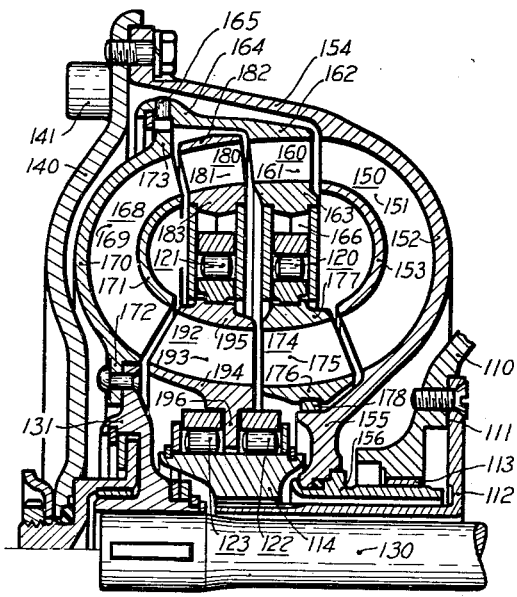
Fig. 17.
INVENTOR.
Fred E. Ullery Sept. 11, 1956   F. E. ULLERY   2,762,196
HYDRODYNAMIC TORQUE CONVERTER
Filed Nov. 7, 1951   5 Sheets-Sheet 4

INVENTOR.
Fred E. Ullery

Sept. 11, 1956     F. E. ULLERY     2,762,196
HYDRODYNAMIC TORQUE CONVERTER
Filed Nov. 7, 1951     5 Sheets-Sheet 5

Fig. 22. NOMENCLATURE $Q$ = rate of circulation, cu. ft. per sec.
$p$ = density of fluid, slugs per cu. ft.
$A$ = circulation path area, sq. ft.
$R$ = design radius, ft.
$N$ = rotational speed of member, r.p.s.
$Ntc$ = coupling point turbine speed, r.p.s.
$\beta$ = blade angle, + and −, respectively, for forward and backward circumferential velocity components of blades.
$Vcr$ = fluid circumferential velocity at and prior to blade entrance, ft. per sec.

Suffixes:
$n$ – at entrance     $sn$ – at stator entrance
$x$ – at exit     $sx$ – at stator exit
$fsx$ – at final stator exit
$t$ – turbine     $pt$ – preceding turbine
$ptx$ – at the preceding turbine exit
$ftn$ – at the following turbine entrance

Fig. 23. EQUATIONS OF A FREE-WHIRLING MEMBER

The moment of momentum at the exit of the member is equal to that of the fluid prior to entrance, hence $$Q\rho\left(2\pi N R_x + \frac{Q}{A_x}\tan\beta_x\right)R_x = Q\rho\, Vcr\, R_n$$

whence $$2\pi N R_x + \frac{Q}{A_x}\tan\beta_x = Vcr\frac{R_n}{R_x} \quad (a)$$

which is the free vortex law that the circumferential velocity varies inversely as the radius.

From eq. (a)

$$N = \frac{1}{2\pi R_x}\left(Vcr\frac{R_n}{R_x} - \frac{Q}{A_x}\tan\beta_x\right) \quad (b)$$

hence, the fluid circumferential velocity just after entrance is $$\frac{R_n}{R_x}\left(Vcr\frac{R_n}{R_x} - \frac{Q}{A_x}\tan\beta_x\right) + \frac{Q}{A_n}\tan\beta_n \quad (c)$$

The change from $Vcr$ to eq. (c) is the shock velocity, and is $$Vcr\left[1 - \left(\frac{R_n}{R_x}\right)^2\right] - \left[\frac{Q}{A_n}\tan\beta_n - \frac{R_n}{R_x}\frac{Q}{A_x}\tan\beta_x\right] \quad (d)$$

and the approximate shock head loss at entrance in ft., is $$\frac{1}{2g}\left\{Vcr\left[1 - \left(\frac{R_n}{R_x}\right)^2\right] - \left[\frac{Q}{A_n}\tan\beta_n - \frac{R_n}{R_x}\frac{Q}{A_x}\tan\beta_x\right]\right\}^2 \quad (e)$$

Fig. 24. FREE-WHIRLING STATOR HAVING BLADE ENTRANCE SYNCHRONIZED WITH THE FLUID

In eq. (d), substitute for $Vcr$ the circumferential velocity of the fluid as discharged by the preceding turbine member and radially modified, provide appropriate suffixes, and equate to 0, hence $$\frac{R_{ptx}}{R_{sn}}\left[2\pi N_{pt} R_{ptx} + \frac{Q}{A_{ptx}}\tan\beta_{ptx}\right]\left[1 - \left(\frac{R_{sn}}{R_{sx}}\right)^2\right] - \left[\frac{Q}{A_{sn}}\tan\beta_{sn} - \frac{R_{sn}}{R_{sx}}\frac{Q}{A_{sx}}\tan\beta_{sx}\right] = 0 \quad (f)$$

This relationship is desired in the coupling phase approximately when the power source is developing its rated power, the corresponding turbine speed being $N_t'$, and the particular rate of circulation being $Q'$. Also, provide practical limits, $\pm 0.3\, Q'/A_{sn}$. Then the specific relationship is, $$\frac{R_{ptx}}{R_{sn}}\left[2\pi N_t' R_{ptx} + \frac{Q'}{A_{ptx}}\tan\beta_{ptx}\right]\left[1 - \left(\frac{R_{sn}}{R_{sx}}\right)^2\right] - \left[\frac{Q'}{A_{sn}}\tan\beta_{sn} - \frac{R_{sn}}{R_{sx}}\frac{Q'}{A_{sx}}\tan\beta_{sx}\right] = 0 \pm 0.3\frac{Q'}{A_{sn}} \quad (g)$$

Fig. 25. TURBINE MEMBER HAVING BLADE ENTRANCE SYNCHRONIZED WITH THE FLUID

Specifically, being the following turbine of two successive turbine members which are united rotationally and have an intervening free-whirling stator member.

Radially modify the circumferential velocity of the fluid discharged from the preceding turbine member and equate to the fluid circumferential velocity just after entrance in the following turbine member, hence $$\left[2\pi N_t R_{ptx} + \frac{Q}{A_{ptx}}\tan\beta_{ptx}\right]\frac{R_{ptx}}{R_{ftn}} = 2\pi N_t R_{ftn} + \frac{Q}{A_{ftn}}\tan\beta_{ftn}$$

whence $$2\pi N_t R_{ftn}\left[1 - \left(\frac{R_{ptx}}{R_{ftn}}\right)^2\right] - \left[\frac{R_{ptx}}{R_{ftn}}\frac{Q}{A_{ptx}}\tan\beta_{ptx} - \frac{Q}{A_{ftn}}\tan\beta_{ftn}\right] = 0 \quad (h)$$

This relationship is desired in the coupling phase approximately when the power source is developing its rated power, the corresponding turbine speed being $N_t'$, and the particular rate of circulation being $Q'$. Also, provide practical limits, $\pm 0.3\, Q'/A_{ftn}$. Then the specific relationship is, $$2\pi N_t' R_{ftn}\left[1 - \left(\frac{R_{ptx}}{R_{ftn}}\right)^2\right] - \left[\frac{R_{ptx}}{R_{ftn}}\frac{Q'}{A_{ptx}}\tan\beta_{ptx} - \frac{Q'}{A_{ftn}}\tan\beta_{ftn}\right] = 0 \pm 0.3\frac{Q'}{A_{ftn}} \quad (j)$$

Fig. 26. COUPLING POINT EQUATION

Specifically, the relationship of $Ntc$ to: the rate of circulation, the exit features of the final stator member, and the exit features of the nearest turbine member preceding the final stator member.

For the final stator member, torque = 0, and speed = 0, at the coupling point. Hence, the circumferential velocity at the exit of the final stator member is equal to the radially modified circumferential velocity at the exit of the nearest preceding turbine member, $$\frac{Q}{A_{fsx}}\tan\beta_{fsx} = \frac{R_{ptx}}{R_{fsx}}\left[2\pi Ntc\, R_{ptx} + \frac{Q}{A_{ptx}}\tan\beta_{ptx}\right]$$

whence $$Ntc = \frac{1}{2\pi R_{ptx}}\left[\frac{R_{fsx}}{R_{ptx}}\frac{Q}{A_{fsx}}\tan\beta_{fsx} - \frac{Q}{A_{ptx}}\tan\beta_{ptx}\right] \quad (k)$$

INVENTOR.
*Fred E. Ullery*

United States Patent Office 2,762,196
Patented Sept. 11, 1956

2,762,196

HYDRODYNAMIC TORQUE CONVERTER

Fred E. Ullery, Detroit, Mich.

Application November 7, 1951, Serial No. 255,167

59 Claims. (Cl. 60—54)

This application is a continuation-in-part of my pending application Serial No. 238,459, filed July 25, 1951, which may be considered the parent application. There are continuation-in-part applications relating to inventions which are at least partially disclosed herein. Those applications are as follows: Serial No. 261,702, filed December 14, 1951; Serial No. 271,550, filed February 14, 1952; Serial No. 283,090, filed April 18, 1952; and Serial No. 286,117, filed May 5, 1952.

Also, there are other applications claiming inventions undisclosed herein, but using a disclosed embodiment hereof as a setting. Those applications are: Serial No. 298,560, filed July 12, 1952; and Serial No. 313,471, filed October 7, 1952.

The invention of this particular application relates to an improved class of hydrodynamic torque converters with physical features conducive to high torque ratio near stall, and high efficiency near to and in a coupling phase of operation. This family or class of torque converters is not restricted to any particular field of application or usage, but is especially desirable for any application needing or requiring an efficient coupling phase.

This improved class of torque converters includes various combinations of bladed members, with each combination having, a multi-stage turbine arrangement and novel features characterizing particular members. Herein, a multi-stage turbine arrangement is considered that having, plural turbine members in the fluid circuit with at least one interrupted space between the first and the final turbine members, and at least one stator member interposed in each interrupted space.

The invention of this application and that of the parent application are distinct inventions which may be used in co-operative relationship in some embodiments of torque converters, but neither invention is restricted to embodiments of the other. The invention of the parent application relates to a novel class of torque converters with certain unique physical features, and having a unique humpbacked form of input speed curve; thus permitting the power source unusual freedom to develop power. The present application concerns improvements which give more efficient conversion of the input power to output power. The concepts of some of these improvements were disclosed and partially discussed in the parent application.

Furthermore, the preferred embodiment exemplified and described for this application is the same as that of the parent application. In this preferred embodiment, both of these inventions cooperate to achieve the superior characteristics disclosed.

One important object of this invention is to reduce and practically eliminate in the coupling phase, the shock head loss at the entrance of a stator member.

Another important object is to reduce and practically eliminate in the coupling phase, the shock head loss at the entrance of a particular turbine member which follows a stator member.

A principal object is to provide torque converters which convert the input power to output power as desired, but with a generally reduced rate of fluid circulation, obviously lowering the circulation head losses and also some of the shock head losses, and at the same time, generally raising the gross head to which all the simultaneous head losses are of relative influence.

A comprehensive object is to provide a variety of torque converters having superior performance characteristics, each torque converter comprising a combination of bladed members commensurate with the requirements of the particular application; the performance factors being, torque ratio and efficiency in the torque conversion range, and efficiency in the coupling phase.

These objects as well as others will be apparent throughout this specification.

Some of the influences and characteristics of multi-stage turbine arrangements are well known in the art. It is generally known that multi-staging improves torque ratio near stall, and that a stator member positioned in the outer portion of the fluid circuit aids stall reaction torque more than a similar stator member positioned radially closer to the axis of the torque converter. Also, that fixed stator members subsequently in the high speed ratio range have adverse influences, the most serious being shock head loss, causing a rapid drop in efficiency; and that stator members which characteristically, are most advantageous at stall, are most detrimental at high speed ratio operation. Consequently, the use of these arrangements have been limited generally to applications, such as: installations using the torque converter only for the starting operation, and cutting it out of the drive train for normal operation; and situations for which the advantages of the flexible output power more than offset the low efficiency in the higher speed range, for instance, applications involving extreme fluctuations of output torque which occur very frequently or continuously.

Numerous mechanisms and contrivances have been devised to reduce this shock head loss influence of stator members in the higher speed-ratio range of operation. Some early arrangements show by-passing fluid passages, or selective circuits for the pump or turbine members or for both. Various forms of retractile members have been proposed, some of the simpler versions merely withdrew the blades from the fluid circuit, but others were shuttle type, having two or more rows of blades which could be successively positioned in the fluid circuit, each row of blades being disposed angularly for a particular range of operation.

Another group of devices are those having pivoted blades, many types of which are shown in the prior art. Some of these have the angular disposition of blades externally controlled, some have centrifugal influences to vary the blade angles, and others have blades which are individually one-way acting, each blade having a stop in one direction but being free swinging in the other. Some devices have a single row of pivoted blades, or a row of pivoted blades auxiliary to the entrance of a row of fixed blades, and some show plural rows of overlapping pivoted blades having a shingled form near stall, but a staggered louvre disposition for high speed operation.

Also, there are a variety of one-way rotatory stator members shown in the prior art: some with a separately controlled brake arrangement; and others having various forms of one-way devices, preventing backward but permitting forward rotation of the stator member or members. Some of these arrangements include clutching means to subsequently secure a stator member to the preceding turbine member or to the following turbine or pump member. Apparently to simulate clutching to a turbine member, one device shows for a stator member, an exit radius smaller than its entrance radius, so that when the apparatus is transmitting the maximum available power, the stator member is driven or tends to be driven forwardly by the liquid substantially at the same speed of rotation as the turbine.

The one-way rotatory stator member is the only one of these various types of devices that has received extensive acceptance. Most of the current torque converters have one or two stator members, each positioned in the inner half of the fluid circuit, and each rotationally controlled by a respective one-way device, providing a fluid coupling phase of operation, or avoiding hydraulic losses when the turbine and pump members are clutched in rotational unisonance for a mechanical drive.

In each embodiment of this invention, each stator member is approximately one-way acting. Most of the stator members have a respective one-way device to provide this characteristic, but two stator members which inherently have similar forward speed characteristics may be joined and provided with a single one-way device.

This invention contemplates the construction having the entrance and the exit features of a one-way acting stator member correlated, and related to the environment, so that in the coupling phase (usually early), the fluid immediately after entrance to the stator blades is approximately synchronized with the approaching fluid; that is, the fluid enters the stator blades with little or no change in circumferential velocity, practically eliminating shock head loss at the particular entrance. Unless the entrance radius of the stator member is considerably smaller than the exit radius of the preceding turbine member, this shockless situation requires a rotational speed of the stator member considerably slower than that of the preceding turbine member—the blade angle at the stator entrance being decidedly different from the blade angle at the exit of the preceding turbine member, and desirably so, as explained later in this specification.

This invention includes the concept of having two turbine members with at least one intervening one-way acting stator member, and having the exit features of the preceding turbine and the entrance features of the following turbine correlated and related to the environment, so that in the coupling phase (usually early), the fluid immediately after entrance to the blades of the following turbine member is approximately synchronized with the approaching fluid; that is, the fluid enters the blades of the following turbine member with little or no change in circumferential velocity, practically eliminating shock head loss at the particular entrance.

These improvements permit the use of a multi-stage turbine arrangement in a torque converter combination to improve stall torque ratio and efficiency early in the torque conversion range, without incurring serious shock head losses near to and in the coupling phase; thus retaining good efficiency in the coupling phase.

Also, this invention includes the concept of a variety of torque converters, having a multi-stage turbine arrangement including an outer stator member, and having particular features including a reduced circulation path area at the exit of the final stator member and at the exit of the nearest preceding turbine member—thus furthering high efficiency near to and in the coupling phase. The outer stator member relieves the inner stator member or members of much of the reaction requirements near stall, permitting the particular features favorable for high efficiency in the coupling phase.

Furthermore, this invention includes the concept of having a multi-stage arrangement in a torque converter combination, in which multi-staging is extensively provided for the general improvement of efficiency, having a stator combination with a stepped mechanical advantage somewhat in accord with the varying requirement for reaction torque through the torque conversion range, generally reducing the rate of circulation required for the desired reaction torque. This reduction in the rate of circulation, lowers the circulation head losses and some of the shock head losses, and inversely raises the gross heads. Thus a general and quite substantial improvement in efficiency is obtained—the loss heads being reduced and being relative to the corresponding gross head which is increased. The rate of circulation being reduced, the pump and turbine members for a particular application obviously are granted larger radial proportions to provide the required change of moment of momentum of the circulating fluid. Thus for a particular application the diameter of the torque converter is increased which obviously is favorable for high efficiency in the coupling phase.

In the accompanying drawings, forming a part of this specification:

Figure 1 is somewhat more than a half section longitudinally through the axis of rotation of the preferred embodiment;

Figure 2 is an enlarged fragmentary section on line 2—2 of Figure 1, showing the arrangement of the one-way devices positioned in the core cavity;

Figure 3 is an enlarged fragmentary section on line 3—3 of Figure 1, showing the arrangement of the one-way devices positioned between the fluid recirculating path and the axis of rotation;

Figure 18:
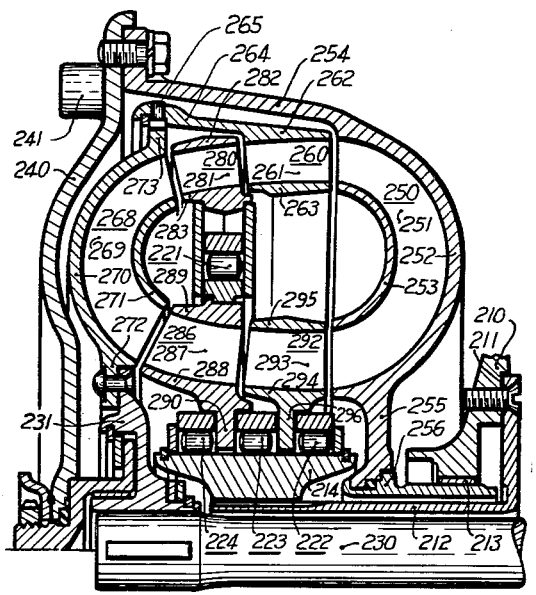
Figure 19:
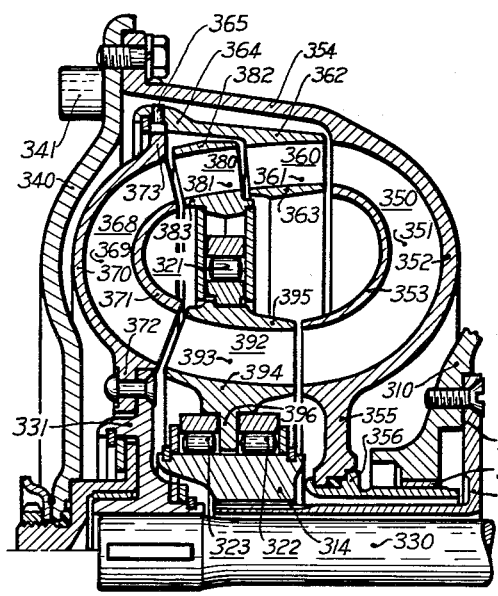
Figure 20:
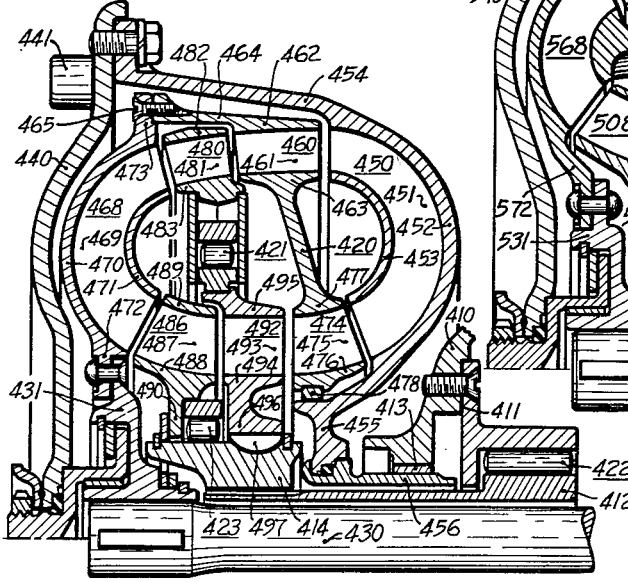
Figure 21:
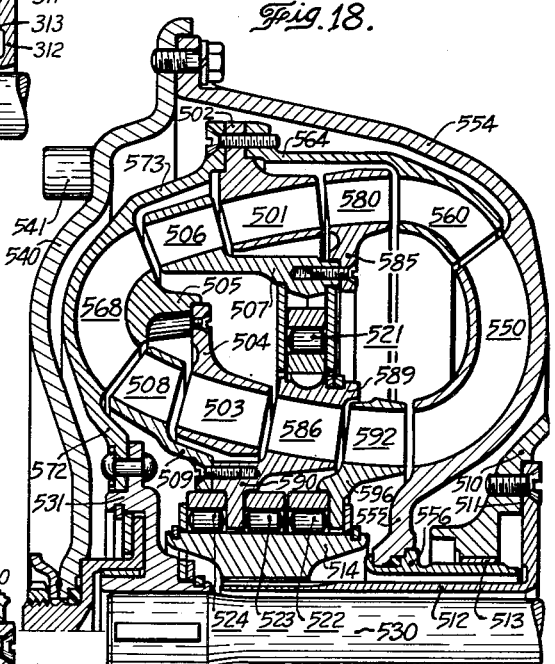

Figures 8, 9, 10, 11, 12, 13, and 14 are diagrams illustrative of shock head losses at the entrance of the bladed members, respectively, pump, first turbine, second turbine, third turbine, first stator, second stator, and third stator, of the embodiment illustrated in Figure 1;

Figure 15 is a sketch of a stator blade and the exit portion of a turbine blade, diagrammatically illustrating a desirable disposition of the stator entrance angle relative to its exit angle and that of the turbine blade;

Figure 16 is a sketch of a stator blade and the exit portion of a turbine blade, diagrammatically illustrating the disposition of the stator entrance angle relative the turbine blade exit angle required for shockless entrance when the stator rotates in unisonance with the turbine;

Figure 17 is a somewhat diagrammatical illustration of an embodiment with six bladed members, one pump, three turbines and two stator members;

Figure 18 is a somewhat diagrammatical illustration of an embodiment with six bladed members, one pump, two turbines, and three stator members;

Figure 19 is a somewhat diagrammatical illustration of an embodiment with five bladed members, one pump, two turbines, and two stator members;

Figure 20 is a somewhat diagrammatical illustration of an embodiment, with seven bladed members as illustrated in Figure 1, but with relocation of two of the one-way devices of the stator combination, and having the third turbine member rotationally united with the first turbine member;

Figure 21 is a somewhat diagrammatical illustration of an embodiment with ten bladed members, one pump, four turbines, and five stator members;

Figure 22 is a tabulation of terms used in derivations of various relationships in Figures 23–26 incl.;

Figure 23 shows the derivation of the equations for a free-whirling member, including rotational speed, shock velocity and shock head equations;

Figure 24 shows the derivation of the equation for shockless entrance to a free-whirling stator member and the equation for particular conditions;

Figure 25 shows the derivation of the equation for shockless entrance to a particular turbine member and the equation for particular conditions; and, Figure 26 shows the derivation of the equation revealing the relationships at the coupling point.

Terminology and basic relationships

Before describing the specific details of this invention, it appears desirable to define some of the terms, and to establish some of the basic relationships, which influence the unique characteristics obtained thereby rendering the specification more significant and expressive of intention and purpose and reducing periodic explanations.

Except as noted, terms used herein are as recommended and with the meaning as defined in Hydrodynamic Drive Terminology, pages 738–740 of the 1951 S. A. E. Handbook, published by the Society of Automotive Engineers, Inc. Where optional terms are listed, the first is considered preferable and will be used in this specification.

As used in this specification, a hydrodynamic torque converter is a drive that transmits power by dynamic fluid action in a closed recirculating path of toroidal form and has a fluid coupling phase as well as torque conversion phases of operation, and physically comprises: a plurality of co-axial members including at least, one pump, two turbines and two stators, with mountings to maintain axial spaced relationship and to permit each member to rotate forwardly about the common axis in at least one phase of operation; a fluid system including an adequate fluid supply and suitable fluid control, as well as a cooling means if required; and structural components including, a stationary housing or support structure, a rotatory casing with suitable seals, an input power structure, an output power shaft or structure, and a reaction torque structure.

Each member has at least one row of circumferentially spaced blades, extending across a fluid path between core and shell shroud elements, which respectively, define part of the core and shell boundaries of the fluid recirculating path. Obviously, if desired for some members, one of the shroud elements could be omitted, the blades being projected from and supported by one shroud element, and the fluid path boundary function of the omitted element provided in another manner.

Each member is externally associated in accordance with its specific character, being joined by a respective attaching construction to the proper driving, driven, or reaction structure: a pump member is joined to an input power driving structure to cause forward rotation and to transmit power to the circulating fluid; a turbine member is joined to a driven structure communicating with an output power shaft or structure, enabling it to contribute torque at least in the forward direction to the output shaft; and, a stator member is joined to a reaction structure associated with the stationary housing, enabling it to transmit torque to the stationary housing at least in the backward direction.

The driving structure for a pump member, the driven structure for a turbine member, or the reaction structure for a stator member, may be, a simple element, a series of elements which may include one or more kindred members as structural elements, or a trunk arrangement with a particular confluent branch; and may include a device rendering the particular member one-way acting relative to its external association. The attaching construction of a member is the means of ataching the member to, and is part of, its particular driving, driven, or reaction structure. It may be, a mating surface, a conjunctive element, or a series of elements; and may include a device rendering the particular member one-way acting.

Forward rotation is the direction of rotation of the pump member. All vector quantities in the forward direction are considered positive, and in the backward direction, negative.

Fluid circuit refers to the fluid recirculating path. The average radius of the fluid circuit is the average of, the largest design radius, and the smallest design radius of the fluid circuit. In reference to the fluid circuit, the outer half and the inner half indicate respectively, the radially outward portion and the radially inward portion, relative to the average radius of the fluid circuit. Accordingly, an outer member has the design radii of its blades larger, and an inner member has the design radii of its blades smaller, than the average radius of the fluid circuit.

Rate of circulation is the volume of fluid per unit time passing a particular location, and herein is expressed, cu. ft. per sec. Being a closed path, the rate is simultaneously constant throughout the fluid circuit.

The circulation velocity is the component of the fluid absolute velocity in a plane passing through the axis of rotation. The circulation path area being the area normal to the circulation velocity, the circulation velocity is the rate of circulation divided by the circulation path area.

Physically defined, the "circulation path area" at a specified location of the fluid circuit is the portion of the area of a particular surface of revolution which cuts across the fluid channels between the blades, that surface of revolution being that generated about the torque converter axis of rotation by a line which, at the specified location, is perpendicular to the design path and extends from the core to the shell shroud. In other words, the circulation path area is the area of the particular surface of revolution less the areas of the blade sections cut by that surface of revolution. If, at the specified location, the design path is axially disposed, the surface of revolution is an annular plane surface; if the design path is radially disposed, that surface is a lateral surface of a cylinder; otherwise, the surface of revolution is the lateral surface of the frustum of a cone.

The circumferential velocity of the fluid is the component of the fluid absolute velocity in a plane perpendicular to the axis of rotation.

The term blade angle as used herein refers to the effective blade angle, being the included angle between the fluid absolute velocity and a plane which passes through the axis of rotation and rotates in unison with the blades. Blade angles are considered positive and negative, respectively, for forward and backward circumferential components with the normal direction of fluid circulation.

The input power head is called the gross head. In equation form, the gross head, ft. equals $$\frac{\text{Power input, ft. lbs. per sec.}}{\text{Rate of circulation} \times \text{Fluid specific weight}}$$

in which, rate of circulation is cu. ft. per sec., and fluid specific weight is lbs. per cu. ft. The influence of a loss head is relative to the corresponding gross head; that is, $$\text{Loss, per cent, equals } \frac{\text{loss head, ft.}}{\text{gross head, ft.}} \times 100$$

Figure 6:
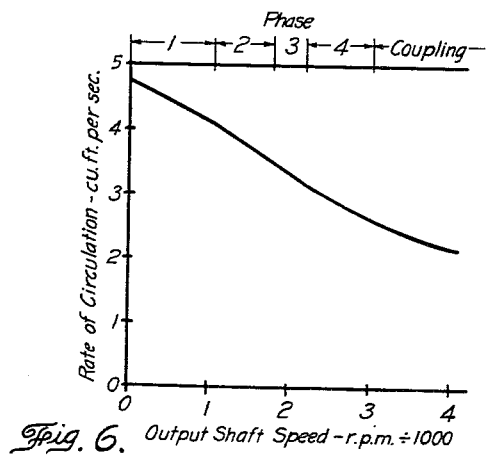
Figure 6 is a diagram illustrative of the rate of fluid circulation in the preferred embodiment illustrated in Figure 1.
Figure 7:
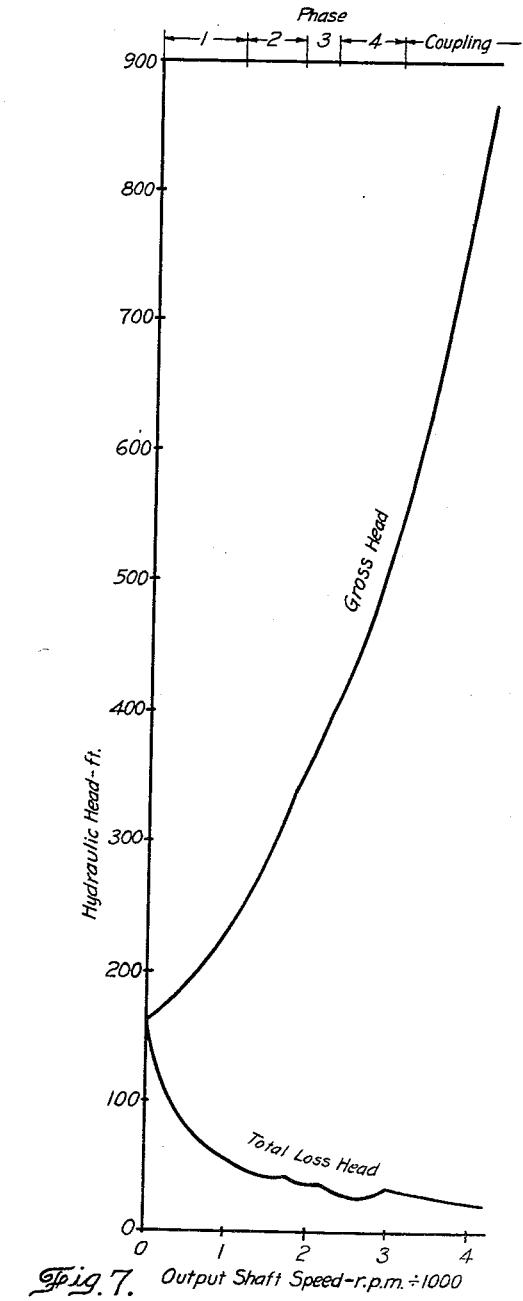
Figure 7 is a diagram illustrative of the gross head and the total loss head of the preferred embodiment illustrated in Figure 1.

It is this particular combination of factors which permits a torque converter to have a high efficiency in the coupling phase. As shown by Fig. 6, the rate of circulation in the coupling phase is low, tending to be a low circulation head loss in spite of blade configurations, and at the same time as shown by Fig. 7, the corresponding gross head is very high; consequently, the actual loss in per cent may be quite low in the coupling phase of a torque converter.

The hydraulic losses are divided into two distinct groups; namely, circulation head losses and shock head losses. The circulation head is that required to overcome the flow resistance of the passages and the coincidental turbulence with the particular rate of circulation.

The shock head losses are attendant to the circumferential velocity of the fluid. Such a loss is entailed at a blade entrance which requires a sudden change in the fluid circumferential velocity. This velocity change is termed the shock velocity. The attending shock head loss, ft. equals $$\frac{\text{Constant (shock velocity, ft. per sec.)}^2}{2g}$$

The value of the constant may generally be considered unity. Actually, it varies with the blade entrance tip form, the blade spacing, and the angle of impingement, which is the angle of misalignment of the approaching fluid from the blade disposition. Also, it is generally larger for back impingement on the blades, than it is for face impingement. Herein, the shock head for face impingement is called face shock head, and for back impingement, back shock head.

The curves of Figs. 4–14 incl. are based on an input torque simulating the wide open throttle torque of a particular engine. Comparable curves for partial throttle conditions may be constructed by applying the basic torque converter relationships:

Pump torque plus stator torque equals turbine torque.
Speed ratio × torque ratio × 100 equals efficiency, per cent.
At any specific speed ratio:
Pump torque and the hydraulic heads vary directly as the second power of the pump speed.
Fluid circulation varies directly as the pump speed.

Hence, if the pump torque is reduced to one-fourth of its original torque and the speed ratio of the output speed to the input speed is maintained: the pump speed and that of all other members will be reduced to one-half, all members retaining their original speed ratios; the rate of fluid circulation is also reduced to one-half; and, all the torques and the hydraulic heads are reduced to one-fourth of their respective original values. Thus, if the particular speed ratio exemplified was that of the coupling point, the torque conversion range would be reduced to one-half of its original speed range. This is presented to point out that phase changes concur with respective speed ratios, and not according to specific output speeds. Also to emphasize that for part-load operation, the speed range of torque conversion compresses, and that of coupling operation expands; thus showing the importance of high efficiency in the coupling phase—for many applications, most of the usage requires only a fraction of the available torque of the power source, hence tends to be operation, near to, or in the coupling phase.

A one-way device is the term used in this specification for a mechanism to render a bladed member one-way acting relative to its respective external association. It is suitably positioned in the connecting structure extending from the particular member to its respective external association, enabling the member to transmit torque thereto but only in a specific direction, and permitting relative rotation of the member in the opposite direction. Figures 2 and 3 illustrate suitable one-way devices for the embodiments of this specification.

Considering the moment of momentum of the circulating fluid vectorially positive in the forward direction, and negative in the backward direction: a stator member with a one-way device can increase, but can not reduce the moment of momentum; and a turbine member with a one-way device can reduce, but can not increase the moment of momentum of the circulating fluid. Actually, there is a slight influence counter to the direction of relative rotation due to friction in the one-way device and in the rotational mounting of the member, some of which may be intentionally provided to damp rotational hunting and fluctuation of the member.

Free-whirling is the term used herein, to distinctly indicate the state of free rotation of a member by virtue of a one-way device in the connecting structure of the particular member.

As previously stated, a free-whirling member does not appreciably change the moment of momentum of the circulating fluid, and hence, free-whirling is a non-functional phase of operation for the particular member. However, a free-whirling member may have other influences which are very detrimental hydraulically, that is, circulation and shock head losses. It is apparent that a free-whirling member adds to the circulation head loss according to the flow resistance of its bladed passages; however, this loss is small in the late phases of operation when the rate of fluid circulation is relatively low.

The most serious influence of a free-whirling member usually is its respective shock head loss. The nature of this loss is dependent on the form of the particular member relative to the physical environment. Fortunately with due consideration of the pertinent factors, the shock loss may be appreciably reduced, and substantially eliminated in some phases. Control of these losses is a vital factor in obtaining high efficiency of power transmission with which this invention is objectively concerned.

With symbols as tabulated in Figure 22, the equations of relationships for a free-whirling member are derived in Figure 23 with explanatory notes.

For zero shock velocity equation $(d)$ is equal to zero, and gives the proportions of radii and passage areas of a member required to eliminate the shock head loss for a particular circumferential velocity at entrance. The physical significance is simple—the absolute velocity of the fluid directionally varies to conform generally to the blade effective curvature, at least at entrance as well as at exit, when the shock velocity is equal to zero.

It has been stated that a free-whirling member does not appreciably change the moment of momentum of the circulating fluid. This is true concerning the total effect, but normally, there is an intervening fluctuation. With the change in circumferential velocity (shock velocity) at the blade entrance, there is a corresponding change in the moment of momentum which imparts an impulse drive to the blades. As the fluid passes through to the blade exit, there is a counterbalancing reaction drive on the blades, restoring the moment of momentum of the circulating fluid.

Characteristically, the free-whirling state of a member starts after an appreciable angle of back impingement has developed. Subsequently, this impingement may actually veer to the face side of the blades by virtue of relationships shown in equation $(d)$. For a free-whirling stator member, it is desirable that the fluid enter the blades without shock head loss early in the coupling phase. As previously shown the coupling phase expands over a wide speed range for part-load operation, and it is accordingly important to provide high efficiency in this phase which is used extensively for most applications.

In the embodiments of this specification, the fluid approaching a free-whirling stator member, is dominated by the exit of the nearest preceding turbine member. So, the circumferential velocity of the approaching fluid is that at the exit of the nearest preceding turbine member, modified inversely as the change of radius from the exit of the turbine member to the entrance of the free-whirling stator member. However, for most situations this radius influence is insignificant, the exit of the turbine member being close to the entrance of the free-whirling stator member.

For zero shock velocity when this radius change is insignificant, the stator must rotationally lag behind the turbine member, so that the difference of physical circumferential velocity offsets the difference of circumferential components of the adjacent blade angles, at the turbine exit and at the stator entrance. It is normal and quite important to have the circumferential velocity component of the turbine blade exit vectorially less, and considerably so, than that of the stator entrance. This will be shown with the aid of two simple diagrams.

Figures 15 and 16 show hypothetical blades. Each figure shows the exit portion of a turbine blade with an exit angle of $-\theta$, and a subsequent stator member blade having an exit angle of $\phi$. In Figure 15, the entrance angle of the stator blade is zero; in Figure 16, that angle is $-\theta$, the same as that of the turbine blade exit, being the relationship required for zero shock velocity when the particular stator and turbine members rotate in unisonance. It will be shown that the latter disposition involves a serious shock head loss in the region where the stator starts free-whirling.

To further simplify the exemplification, without taking undue liberty, it may be assumed that both, the circulation path area and the design radius, are the same for both illustrations, and are constant from the turbine exit to the stator exit. Hence, the circulation velocity is simultaneously constant from the turbine exit to the stator exit, being the instantaneous rate of circulation divided by the circulation path area, and is represented by $V_f$. Consequently, the circumferential component at the turbine blade exit is $V_f \tan(-\theta) = -V_f \tan \theta$; that at the stator blade exit is $V_f \tan \phi$; with the total change being $V_f (\tan \theta + \tan \phi)$. To give tangible significance, it is assumed that $\tan \theta + \tan \phi$ equals 1.50, which is a conservative figure—in some well known torque converters, the comparable value is close to or even in excess of 3.00. To give further tangible significance, the various shock head losses will be expressed as percentages of the kinetic energy head of the circulation velocity, and which is $(V_f)^2/2g$.

In Figure 15, evenly divide the total circumferential change, so that the extent of change at entrance is the same as the subsequent change through the stator, $-\tan \theta$ being $-0.75$ and $\tan \phi$ being 0.75. Then at stall the fluid impinges on the face of the stator blade with a shock velocity of $0.75V_f$ and the shock head is 56¼% of $(V_f)^2/2g$. As the turbine speed increases from stall, this impingement veers to the back side of the blade, and the stator free-whirls when the angle of impingement coincides with angle $\phi$, the shock velocity being 0.75 $V_f$, and the shock head loss, 56¼% of $(V_f)^2/2g$. With a constant circulation path area and design radius through the stator, this relationship would continue through subsequent phases, the actual shock head in feet dropping, of course, as $V_f$ decreases. However, with the proper radius and/or area changes through the stator member, this shock velocity may be practically eliminated for a subsequent speed ratio of the torque converter.

Here, it is important to note the result of more extensive radius and/or area changes to bring the stator to rotational unisonance with the turbine member. Then the fluid would impinge on the face side with a shock velocity of $0.75V_f$ and a shock head loss of 56¼% of $(V_f)^2/2g$, which is of the same magnitude as that for the constant radius and area situation. Furthermore, beyond this resonant condition, the shock head rises rapidly as the stator speed exceeds that of the turbine.

For the stator blade shown in Figure 16, the shock velocity at stall is zero. From stall, the angle of fluid impingement on the back of the blade increases until it is equal to angle $\phi$, then the stator free-whirls. At this point, the shock velocity is $V_f(\tan \phi + \tan \theta)$ and equals $1.50V_f$, and the shock head loss is 225% of $V_f^2/2g$. With the constant radius and area assumed, this relationship would continue for subsequent phases, the shock head loss in feet dropping with the decreasing $V_f$; but with a suitable radius and/or area changes, the rotation of the stator member could be made unisonant with the turbine member at a later speed ratio of the torque converter.

This loss near and at the point of free-whirling is obviously prohibitive—it is four times greater than that of the example of Figure 15. This loss reduces, not only efficiency, but also the torque ratio. It occurs in the torque conversion range, at any point of which the torque converter may occasionally be required to operate for a considerable period of time.

These cases demonstrate the importance of having the stator blade entrance angle distinctly different from the blade exit angle of the nearest preceding turbine member. Unless there is a considerable change of radius from the turbine exit to the stator entrance, it follows that, for zero shock velocity at the entrance of a free-whirling stator member in the coupling phase, the rotational speed of the stator member must be sufficiently different to offset the difference of blade components.

It is not always desirable to evenly divide the circumferential change effected by a stator member, as was exemplified for Figure 15. Generally, the division should be limited to within the middle third, so that the junction change is not less than one-third or more than two-thirds of the total change. Otherwise, it becomes a case of diminishing returns in one phase at the expense of pyramiding losses in another phase, as exemplified by Figure 16.

Using the general relationships of a free-whirling member as derived in Figure 23, the equation for a free-whirling stator member, having the fluid synchronized for shockless entrance early in the coupling phase, is derived in Figure 24; and equation (g) of Figure 24 is a practical expression of the particular relationships.

In multi-staging, it is also important about the same time, to practically eliminate shock head loss at the entrance of a turbine member which follows a free-whirling stator member. The required relationships of the exit features of a preceding turbine member and the entrance features of a following turbine member to each other and to the environment are shown in equation (j) of Figure 25.

The respective notes of equations (g) and (j) refer to basic principles which have been heretofore disclosed, and generally explain the particular derivations. However, it appears desirable to further explain certain items: the shock velocity tolerances, the turbine speed $N_t'$, at which the power source is developing its rated power, and the rate of circulation $Q'$.

It is, of course, impractical to specify zero shock velocity—certain tolerances must be permitted. In equations (g) and (j), the shock velocity is specified as zero, plus or minus 0.30 of the circulation velocity at the respective entrance, which is a close tolerance considering that the circulation velocity is relatively low in the coupling phase. This permits an angle of impingement to the blade, ranging from 17 degrees on the face side to 17 degrees on the back side, if the respective blade angle is zero; but, the angle of impingement permitted is considerably less for large entrance angles, being the differences of large tangent values; e. g., if the blade angle is 45 degrees, the tolerances shown would permit an angle of impingement ranging from about 10 degrees at one side to only 7½ degrees at the opposite side of the particular blade. Furthermore, these limits restrict the particular shock head loss to not more than 9% of the kinetic energy head of the respective circulation velocity, which is a small figure inasmuch as the rate of circulation is low in the coupling phase. In the light of the discussions relative to Figures 15 and 16, and the complexities involved, these tolerances are relatively narrow; certainly narrow enough to indicate intent, but it is believed wide enough to permit manufacture consistently within the limits.

$N_t'$ of equations (g) and (j) is a particular turbine speed for full-throttle power input in the coupling phase, being the speed at which it is most advantageous to eliminate the particular shock head losses. That is, $N_t'$ is not less than the coupling point turbine speed for full-throttle power input, and generally, it should be at least 10 per cent greater. In the derivations, $N_t'$ is conveniently defined as a turbine speed in the coupling phase approximately when the power source is developing its rated power. For an automotive engine, rated power means maximum power; for a heavy duty engine, rated power indicates the maximum power available near the governed or at the recommended speed of operation. It is general practice to blend a torque converter with an engine so that the engine speed at the coupling point is 5 to 20 per cent less than that at rated power. Consequently, rated power is developed in the coupling phase approximately at the same turbine speed at which it is desirable to have the shock losses eliminated. So, it is convenient to define $N_t'$ as that obtained for rated input power conditions, $N_t'$ being equal to the particular pump speed times efficiency/100.

However, for the sake of definiteness it is preferable to define $N_t'$ relative to the turbine speed at the coupling point for wide-open throttle input power operation. Thus, specifically stated with physical limits, $N_t'$ is, for wide-open throttle input power operation, a turbine rotational speed 10 to 20 per cent faster than that at the coupling point.

$Q'$ is the rate of circulation concurrent with the particular turbine speed $N_t'$. The value of $Q'$ is taken from the design rate of circulation curve, otherwise required to properly proportion and correlate the features of the various bladed members.

Equation $(k)$ of Figure 26 shows the requirements at the coupling point, the turbine speed at the coupling point being the speed range of torque conversion. The notes preceding this equation explain the derivation.

The desired turbine speed at the coupling point is dependent on the characteristics of the power source, which in the torque conversion range should be allowed to have sufficient speed to develop approximately its maximum power. At the coupling point, the turbine speed is equal to the pump speed times efficiency/100. If this turbine speed is too low, the speed and the power output of the power source is accordingly restricted.

As shown in equation $(k)$, the coupling point turbine speed is directly proportional to the rate of circulation, which as previously explained should be low, to reduce the circulation head losses, and to provide a high gross head to which all head losses are relative.

The coupling point turbine speed is approximately proportional to the sum of the tangents of the blade angles at the exit of the final stator member and at the exit of the nearest preceding turbine member (the equation shows the difference of these angles but the turbine angle is negative, the result being the sum). These angles generally are made as large as practical, the limitations being: the passage choking influence of large angles, and the resulting high flow velocities relative to the blade surfaces; high shock angles of fluid entry into the inner stator member or members; and objectionable warp and contortion of the blades.

Also, this coupling point speed is inversely proportional to the design radius at the exit of the nearest turbine member preceding the final stator. This radius is made as low as practical with consideration of: the space requirements for the attaching constructions, and for the reaction and the driven structures; and the radius changes through the subsequent stator member or members, in accordance with equation $(g)$.

The principal factor undiscussed in equation $(k)$ is the circulation path area at the exits of the final stator member and the nearest preceding turbine member. These areas have an inverse influence on the coupling point turbine speed. It is customary to make the circulation path area approximately constant through the fluid circuit. For the embodiments of this specification, the circulation path area of the inner portion of the fluid circuit may be made less than that of the outer portion. For a particular coupling point speed, this area reduction reduces the rate of circulation required, and consequently, furthers efficiency at the coupling point and in the coupling phase.

In the embodiments of this specification, this reduced circulation path area in the inner portion of the fluid circuit is permitted by the particular multi-staging having a stator member in the outer half of the fluid circuit. Thus, the high reaction torque desired near stall is developed with a much lower rate of circulation than would be required without the outer stator. This reduced rate of circulation reduces the circulation head loss, offsetting the restricting influence of the reduced area of the inner portion of the fluid circuit. Also, this generally reduced rate of circulation extends somewhat over the entire range of operation, generally increasing the gross head and furthering efficiency.

In the embodiment shown in Figure 1, the circulation path area of the inner portion of the circuit may be advantageously reduced about 30 per cent from that of the outer portion. From a constant area fluid circuit, the improvement is most rapid for the first increments of reduction, and decreases to insignificant gains when the total reduction of area is about 30 per cent.

The improvements of this specification permit extensive multi-staging, that is, the use of more than one stator member in, or near, the outer half of the fluid circuit. Thus, high torque ratios may be obtained near stall with rather low rates of circulation. Hitherto, high shock losses incurred at the additional entrances in late phases of operation caused low efficiency in those late phases. By providing the stator and turbine members with features in accordance with equations $(g)$ and $(j)$ respectively, those losses may be greatly reduced, permitting high efficiency near to and in the coupling phase. Furthermore, by using reduced areas at the exits of the final stator and the nearest preceding turbine, the gross head may be increased, also promoting high efficiency. A general reduction of the rate of circulation grants the pump and turbine members larger radial proportions, which are conducive to high efficiency in the coupling phase. One arrangement of extensive multi-staging is illustrated in Figure 21, which will be explained later in this specification.

Description

The embodiment illustrated in Figure 1, is considered the preferred—it gives physical exemplification to basic concepts of this invention, and with diagrams of Figures 4–14 incl., shows achievement of many of the pertinent objectives of this invention. Also, a thorough description and explanation of this embodiment serves to make the features and characteristics of the simpler embodiments apparent with only brief specific comments.

This embodiment is an automotive application in which it is intended that the torque converter should be supplemented with a simple mechanical transmission at the output shaft end. This transmission should have a reverse gear and a low ratio forward gear; the latter, for unusual conditions, such as, prolonged and steep uphill driving, or sustained downhill operation requiring abnormal engine braking. The hydraulic system of this transmission serves the torque converter with an adequate supply of fluid, and provides the charging and the replenishing means and controls.

Referring to Figure 1, a stationary housing 10 bolted to the rear end of the engine, encloses the torque converter, and has a rear face 11 which in this illustration serves as an attachment surface for the supplementary transmission, as well as for the flanged reaction shaft 12 bolted thereto. This is mechanically equivalent to the generally desirable and customary arrangement, in which the reaction shaft is secured to a stationary portion of the supplementary transmission, and which in effect serves as part of the reaction structure.

The torque converter cover 40 encloses the torque converter fluid chamber and serves as part of the pump driving structure from the engine. This cover has a series of circumferentially spaced knobs 41. Screws through the web of the engine fly-wheel and threaded into these knobs, provide the torque converter driving connection.

An output shaft 30 transmits the torque converter output power to the supplementary transmission.

The bladed members, in the order of arrangement of their blades in the fluid recirculating path in the direction of fluid circulation, and starting at the pump entrance, are: the pump member 50, the first turbine member 60, the first stator member 80, the second turbine member 68, the second stator member 86, the third stator member 92, and the third turbine member 74.

The pump member 50 has a series of blades 51 across a fluid path bounded by shell 52 and core 53. The attaching construction for the pump member includes a skirt-like element 54 near the pump exit extending from the pump shell to the torque converter cover 40 to which it is fastened with screws. Near the pump entrance, and extending inwardly from the pump shell, is a hub element 55 to which is secured a sleeve 56 which is journaled at 13 in stationary housing 10. The pump shell 52, the driving element 54, and the hub element 55, form part of the torque converter fluid casing for this particular embodiment.

The turbine members are described in the order of their physical connection to the output shaft—the members being arranged structurally in series relationship from a single connection to the output shaft.

The second turbine member 68 has a series of blades 69 across the fluid path bounded by shell 70 and core 71. Near the exit of the second turbine member and extending inwardly from the shell, is a driven hub structure consisting of, a hub 31 splined to the output shaft 30 and riveted to a flange element 72 associated with shell 70. This element 72 also serves as a rotational mounting on race 42. Near the entrance of the second turbine member, projecting outwardly, is a rim element 73.

The first turbine member 60 has a series of blades 61 across the fluid path bounded by shell 62 and core 63. A driven skirt-like element 64 extends from the shell, and mates with rim element 73 of the second turbine member. At the mating junction, a driving connection is provided which consists of, square-head pins 65 pressed in drilled holes in element 64, and registering with milled notches in rim element 73. The first turbine core has a driving element 66, illustrated in Figure 2 as a truss-like structure integral with the core 63.

The third turbine member 74 has a series of blades 75 across the fluid path bounded by shell 76 and core 77. A portion of the shell is formed to retain a bearing bushing 78, which is journaled by rim 57 protruding from the pump member hub element 55; thus insuring rotational concentricity of the third turbine member. A one-way device 20 (described in the following paragraph) is interposed between the third turbine core 77 and the driving element 66 associated with the first turbine core. This one-way device prevents forward rotation, but permits backward rotation of the third turbine member relative to the first turbine member, and enables the third turbine member to contribute torque through its driven structure to the torque converter output shaft, but only in the forward direction. As has been described, the driven structure for the third turbine member is a series of structural elements, including the structures of the first and second turbine members.

Figure 2 illustrates one suitable arrangement and construction for one-way device 20. For this particular situation, the race 32 is the driving element of the device. This race is serrated on its inner surface and is shrunk on the third turbine core 77. The driven element consisting of: two annular discs 34, between which a plurality of cams 33 are secured in a radially outward position relative to the race by pins 35. The annular discs in turn are secured by rivets 36 to the driving element 66 associated with the first turbine core. The wedging rollers 37 are urged and guided in wedging position between the cams and the race, by arms 39 actuated by springs 38.

The stator members are somewhat in series structurally, and will be described in order of respective physical proximity to the hollow reaction shaft element 12.

The third stator member 92 has a row of blades 93 across the fluid path bounded by shell 94 and core 95. Associated with the shell, is an element 96 which serves as an attachment flange for a one-way device 22 interposed between the third stator member and the reaction shaft 12. This construction prevents backward rotation, but permits forward rotation of the third stator member relative to the reaction shaft, and enables the third stator member to transmit torque through the reaction structure to the stationary housing 10, but only in the backward direction.

Figure 3 illustrates one suitable arrangement and construction for one-way device 22. An inner race 14, concentric with the axis of rotation, is spline connected to reaction shaft 12. A cam element 15, which is a thick wall race with a plurality of cam surfaces internally, is fastened by rivets 18 to shell flange 96. Wedging rollers 16 are urged in wedging position, between the inner race and the cam surfaces, by springs 17.

The second stator member 86 has a series of blades 87 across the fluid path bounded by shell 88 and core 89. Interposed between the second stator member and the reaction shaft 12, are one-way devices 23 and 24, the cam elements of which are attached with rivets 19 to flange element 90 associated with the second stator shell. The arrangement and construction of each of these one-way devices is the same as that illustrated in Figure 3 for one-way device 22. Two are used to provide adequate capacity and for interchangeability of parts—obviously a single one-way device with adequate capacity may be used. As described, the construction prevents backward rotation, but permits forward rotation of the second stator member relative to the reaction shaft, and enables the second stator member to transmit torque through the reaction structure to the stationary housing 10, but only in the backward direction.

The first stator member 80 has a series of blades 81 across the fluid path bounded by shell 82 and core 83. An element 84 associated with the core provides a connection for the one-way device 21 extending from the first stator core 83 to the second stator core 89. The arrangement and sonstruction of this one-way device is the same as that for one-way device 20 illustrated in Figure 2. The arrangement prevents backward rotation, but permits forward rotation of the first stator member relative to the second stator member, and enables the first stator member to transmit torque, through the reaction structure, including the second stator member as a structural element, to the stationary housing 10, but only in the backward direction.

Also, shown in Figure 1 is a one-way device 25 interposed between the output shaft 30 and the torque converter cover 40. The construction and arrangement is the same as illustrated for one-way device 22 in Figure 3. This one-way device may be termed an anti-coast device. It is used to prevent forward overrun of the output shaft relative to the engine—it provides more engine braking for downhill coasting, and aids push-starting of the engine. This anti-coast device is not pertinent to the invention of this specification—its inclusion is optional and generally complementary. These comments are included to complete the description of this illustration. In Figures 17 to 21 incl., this anti-coast device is omitted.

The bladed members illustrated are formed by casting; however, they may be cast, fabricated, or otherwise made, of any suitable materials without departing from the intent of this specification.

Some of the specific requirements dominating blade angles will be disclosed in a subsequent discussion. Intrinsically, turbine member blades are curved to vectorially reduce, and stator member blades are counter curved to vectorially increase, the moment of momentum of the circulating fluid. However, this specification is not limited to any particular blade form, blade tip form, blade spacing, or necessarily to a single row of blades in any member.

Operation

The basic principle of operation is typical of hydrodynamic torque converters. Mechanical energy is simultaneously transmitted to, and extracted from a fluid circulating in a closed path, in which: pump blades transmit energy to the fluid; turbine blades extract energy from the fluid; and intervening stator blades react and transform the physical properties of the fluid. The objective being increased flexibility of the torque and speed properties of the available power, in accordance with the needs of the particular application—in this instance an automotive drive.

Figure 4:
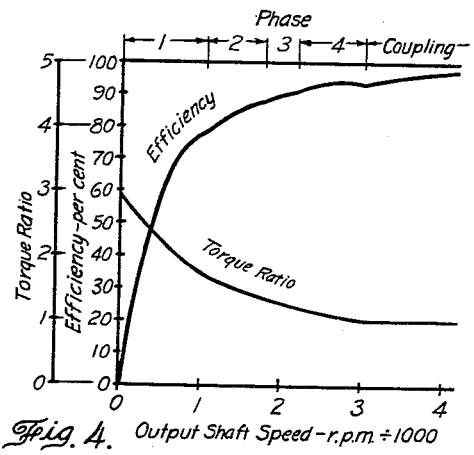
Figure 4 is a diagram illustrative of the efficiency and torque ratio characteristics of the preferred embodiment illustrated in Figure 1.

The curves shown in Figures 4–14 inclusive, graphically indicate the operation and characteristics of the embodiment illustrated in Figure 1. As shown in Figure 4, this embodiment has a high torque ratio at stall and a wide speed range of torque conversion. Also, the efficiency is quite high over a large portion of the torque conversion range and throughout the coupling phase of operation.

Figure 5:
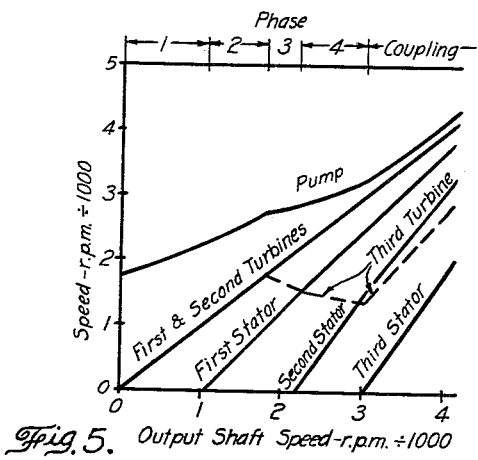
Figure 5 is a diagram illustrative of the rotative speeds of the respective bladed members of the preferred embodiment illustrated in Figure 1.

Figure 5 discloses the rotative speeds of the various members. This is particularly indicative of the mode of operation in showing the respective status of each member. It may be noted that the differential speeds between the first and third turbine members, and between the first and second stator members are not extremely high—accordingly, the sliding velocities between the elements of the one-way devices in those respective locations are not excessive, in spite of acting at a relatively large radius. Also, it should be noted that the speeds of the first and second stator members are considerably slower than that of the first and second turbine members, even in the coupling phase.

The rate of fluid circulation of Figure 6 has the typical trend for a torque converter with torque conversion and coupling phases of operation. To enable the members to develop high torques at stall, the rate tends to be relatively high; to attain high efficiency in the vicinity of the coupling point, the rate must be low as previously mentioned. However, the rate of circulation of this embodiment from stall to the coupling point is, in general, considerably lower than that of current torque converters of comparable capacity.

The gross head curve of Figure 7 was previously explained. The gross head is the denominator to which the simultaneous loss heads are relative in the determination of efficiency.

Figures 8 to 14 inclusive illustrate the shock head losses at the entrance to the blades of the respective members. These curves help to indicate the fluid directional changes through the various phases of operation—face and back shock, respectively indicating face and back impingement of the fluid on the blades.

From stall through the 1st phase, the embodiment illustrated in Figure 1, operates a three-stage torque converter, all the members being functional in the 1st phase. Most of the shock head losses are characteristically high. That of the first turbine member, Figure 9, tends to be self-compensating for all phases of operation—the circumferential velocity components of the adjoining blades vary in accordance with the rate of circulation, and tend to offset the physical velocity differential of the adjacent members. As shown in the coupling phase, there is a slight back shock head at the first turbine blade entrance. When justified, a one-way device could be interposed between the first and second turbine members. In this particular embodiment, it would only function for a high speed and low torque situation.

The 2nd phase of operation starts when the first stator member starts free-whirling in response to the increasing circumferential velocity of the fluid discharged from the first turbine member. Thus, in this phase, the operation is functionally that of a two-stage torque converter. The first stator member is constructed in accordance with equation $(g)$ of Figure 24; and as indicated in Figure 12, the shock head loss is reduced and becomes insignificant in the subsequent coupling phase. Comparable consideration was given to the shock head loss at the entrance to the second turbine blades, as illustrated in Figure 10. After the first stator member free-whirls, the circumferential velocity of the fluid entering the second turbine member is dominated by the exit of the first turbine member. The pertinent features of these members are arranged in accordance with equation $(j)$ of Figure 25; thus, the shock head loss at the second turbine entrance is reduced, so that, it also becomes insignificant in the coupling phase.

The 3rd phase of operation starts when the third turbine member free-whirls. In this phase, and also in the 4th phase, the operation is that of a single-stage torque converter.

Throughout the torque conversion range which includes 1st to 4th phases inclusive, the fluid is discharged to the third turbine member by the third stator member, the blades of which have a strong positive exit angle. Hence, the fluid has a forward circumferential velocity which is very high at stall and decreases to a low value at the coupling point, being proportional to the rate of circulation. The variation in the fluid moment of momentum is considerably greater, being proportional to the second power of the rate of circulation.

The blades of the third turbine member are curved to reduce the fluid circumferential velocity, having an appreciable entrance angle of positive character, and for this particular design, an exit angle which is approximately zero. In the 1st and 2nd phases, the blades reduce the moment of momentum, the change being transmitted to the output shaft as torque. From stall this influence declines: the blade circumferential velocity increases proportionally to the increasing rotative speed of the output shaft; and as previously mentioned, the circumferential velocity of the fluid from the third stator exit simultaneously declines. When the moment of momentum of the fluid leaving the third turbine member is equal to that of the fluid discharged from the third stator exit, the third turbine member free-whirls, and rotationally lags behind the output shaft. In fact, as illustrated in Figure 5, its speed in the 3rd and 4th phases declines in conformity with the declining circumferential velocity of the fluid from the third stator exit; however, in the coupling phase its speed again increases in response to the increasing circumferential velocity of the fluid as then dominated by the second turbine member.

The shock head loss at the entrance to the third turbine member is illustrated in Figure 11, and as shown, the back shock head loss is low in the free-whirling phases and becomes insignificant in the coupling phase. Being a free-whirling turbine member with blades curved to reduce the circumferential velocity of the fluid, it is desirable to have an exit design radius larger than the entrance design radius to reduce shock velocity and the attending shock head loss. This may be shown by inspection of the general shock velocity equation, equation $(d)$ of Figure 23.

Figure 8 illustrates the shock head loss at the entrance to the pump member blades. The action of the third turbine member is a vital factor in curtailing the usual extreme range of shock velocity at the pump entrance. The circumferential velocity of the fluid entering the pump member is successively dominated: by the third turbine member in the 1st and 2nd phases; by the third stator member in the 3rd and 4th phases; and, by the second turbine member in the coupling phase. The influence of the third turbine member permits a pump blade entrance angle of appreciable negative character, which is essential to keep the shock head losses low in the 3rd, 4th and coupling phases.

The 4th phase begins when the second stator member free-whirls. The shock head loss at the blade entrance of the second stator member is illustrated in Figure 13. The circumferential velocity of the fluid entering this member is dominated by the second turbine member for all phases of operation. The exit blade angle of the second turbine member is a large angle of negative character. The second stator blades are curved from a medium size entrance angle of negative character, to an exit angle which is approximately zero. The features of the second stator member are blended in accordance with equation (g) of Figure 24, and as illustrated in Figure 13, the shock head is reduced to an insignificant value in the coupling phase.

The coupling phase commences when the third stator member free-whirls. Figure 14 illstrates the shock head loss at the blade entrance of this third stator member. The circumferential velocity of the fluid entering this member is dominated, by the second stator member in the 1st, 2nd, and 3rd phases; and by the second turbine member in the 4th, and the coupling phases. The third stator blades curve from a medium size positive angle at entrance to a large positive angle at exit.

In the coupling phase, the pump member and the first and second turbine members are the only members that appreciably influence the moment of momentum of the circulating fluid. Actually, the first and second turbine members perform like a single turbine member, receiving fluid from the pump exit, and discharging it to the pump entrance.

This invention is not limited to the free-whirling sequence described, namely: the first stator member, the third turbine member, the second stator member, and finally, the third stator member. By modifications of blade angles, design radii and fluid path areas, the sequence may be changed: the free-whirling of the third turbine member may start earlier than that of the first stator member, or later than that of the second stator member; also, the first and second stator members may be characterized to independently free-whirl at, or about, the same time, and may for practical reasons be rotationally united.

In the embodiment of Figure 1, the first stator member, positioned in the outer half of the fluid circuit, naturally develops high reaction torque near stall. Thus, the desired torque ratio near stall is obtained with an unusually low rate of circulation; permitting the circulation path area of the inner portion of the fluid circuit to be reduced about 30 per cent from that in the outer portion. As shown in equation (k) of Figure 26, this also reduces by about the same percentage, the rate of circulation required at the coupling point.

If this was a general change in circulation velocity through the fluid circuit, the total circulation head loss would be reduced about 50 per cent; however, the circulation velocity is only reduced in the outer portion, that of the inner portion being approximately unchanged; hence, the reduction in total circulation head loss is about 20 per cent.

Probably, the more important effect is the increase in the gross head, which varies inversely as the rate of circulation, the increase in the gross head being about 40 per cent. Inasmuch as the gross head is the denominator to which all the head losses are relative, a very considerable gain in efficiency is obtained at the coupling point.

Otherwise, to acquire the desired efficiency, the coupling point (the speed range of torque conversion) would be reduced; which would lower the speed and the developed power of the power source in the upper portion of the torque conversion range, likewise reducing the power available at the output of the torque converter. For an automotive application this is the upper portion of the "passing zone" in which, the ability to pass quickly is frequently vital to safety; hence, this unusual wide speed range of torque conversion for this embodiment is especially desirable and important.

Other embodiments

The one-way devices shown in the various embodiments of this specification employ spring urged, wedging rollers. These are shown as one practical type of one-way devices. There are many other types of devices and mechanisms which may be used to render a torque converter member one-way acting. Just to emphasize the multiplicity and diversity of such devices, without trying to be all-inclusive, some will be mentioned.

In the class of one-way devices are arrangements employing: pawls, ratchets, wedging elements, toggles, sprags, or wrapping elements.

Also, there are numerous types of clutches which may be actuated by a regulated power medium, such as: mechanical, hydraulic, vacuumatic, pneumatic, electrical, or magnetic. The influence of a clutch is equivalent to that of a one-way device: if the regulator is speed-ratio conscious; or if the regulator responds to torque reversal and to relative speed reversal between the clutch opposing elements, respectively, to release and to apply. For some situations, a speed responsive regulator, with or without, supplementary influence of engine intake manifold pressure, and/or throttle position, may practically simulate the influence of a one-way device.

The improvements of this specification create a variety of torque converters having various combinations of bladed members, each of which has specific utility for particular applications. Some of these combinations are somewhat diagrammatically illustrated in Figures 17–21 incl.

These illustrations also show some variations of attaching constructions, and reaction and driven structures associating the members with external components. No attempt is made to be all-inclusive in this respect. As a matter of simplicity, all of the embodiments are shown with coaxial input driving and output driven structures. Either or both may be, parallel offset, angular offset or angular intersecting, drive structures. In general, these arrangements make the various members more accessible, permitting many forms of attaching constructions, and driving, driven, and reaction structures. Furthermore, a torque converter may be a built-in component of a drive combination having a common enclosure.

In the description of these embodiments, the principal members are mentioned, the distinctive features are explained, and the specific utility is disclosed. To avoid unnecessary repetition, a reasonable degree of reliance is placed on the embodiment illustrated in Figure 1, which was described and explained in detail. Comparable members, elements and components are numbered with the same tenths and unitary digits used in Figure 1, but preluded with a particular hundredths digit. Members are considered comparable according to similarity of influence and function, rather than similarity of names; e. g., if a particular second stator member is most comparable to the third stator member of Figure 1, its reference numbers have the respective tenths and unitary digits of the third stator member in Figure 1. However, in Figure 21, there are members and attachments without counterparts in Figure 1—these members and attachments have reference numbers 501–509 incl.

Figure 17 somewhat diagrammatically illustrates an embodiment in which, one stator member 192 supplants the second and third stator members, 86 and 92 respectively, of Figure 1. In sequence from the entrance of the pump member in the direction of fluid circulation, the members are: the pump member 150, the first turbine member 160, the first stator member 180, the second turbine member 168, the second stator member 192, and the third turbine member 174. A one-way device 121, extending from the first stator core 183 to the second stator core 195, prevents backward rotation but permits forward rotation of the first stator member 180.

The operation of this combination is similar to that of Figure 1, considered without stator member 86. In consideration of this omission, a general revision of blade angles with some modifications of radii is required to comply with the modified rate of circulation.

This combination is more simple and may be made axially shorter than that of Figure 1. Characteristically, this combination gives a high stall torque ratio, but a reduced range of torque conversion, if high efficiency at the coupling point is considered a prime requisite. The utility of this combination tends to be for applications requiring a high stall torque ratio, and using a lower speed power source; and consequently, a shorter range of torque conversion.

At present, there are automotive torque converters which have only one stator member, and that in the inner half of the fluid circuit. Relative to those torque converters, the combination of Figure 17 is far superior, having higher efficiency, higher stall torque ratio, and may have a wider range of torque conversion. The particular multi-staging has very little adverse influence in the coupling phase, being in accordance with the concepts of this specification; but characteristically, lowers the rate of circulation in the interest of higher efficiency. It provides the stall torque ratio with a lower rate of circulation, and permits a reduced area of the inner portion of the circulation path, so that the rate of circulation is also lowered at and near the coupling point. Also, in accordance with this specification, the shock loss at the entrance of the inner stator member may also be reduced and practically eliminated in the coupling base. Furthermore, the one-way acting third turbine member contributes to the superiority of this combination. It very effectively reduces shock head losses at the pump entrance. Also, it provides the humpbacked form of input speed curve, permitting the engine more freedom to develop power in the torque conversion range, thus increasing the available output power of the torque converter.

Figure 18 is a somewhat diagrammatic illustration of an embodiment differing from that of Figure 1, in that, the third turbine member 74 and its one-way device 20 is omitted. In sequence from the entrance of the pump member in the direction of fluid circulation, the members are: the pump member 250, the first turbine member 260, the first stator member 280, the second turbine member 268, the second stator member 286, and the third stator member 292.

Relative to that of Figure 1, this combination is more simple and may be made axially shorter. The operation is similar except for the influences of the third turbine, which is omitted in this combination. Consequently, the shock loss at the pump entrance is considerably higher near stall and in the region of the coupling point. This, of course, tends to reduce somewhat, torque ratio near stall and efficiency in the vicinity of the coupling point. The input speed curve extending from stall to the coupling has a distinct sagging tendency. Having the fluid discharged directly to the pump directly from the final stator member, and having a pump exit blade angle of desirable negative disposition, the input speed curve tends to be flat or to have a rather flat slope from stall to the coupling point. This is a characteristic which is more desirable usually for the heavy duty type than the automotive type of engine; so, the utility of this arrangement tends to reside with heavy duty engines for which a relatively high stall speed is generally favorable. For this usage, this arrangement would provide unusually good torque ratio and efficiency characteristics.

Figure 19 is a diagrammatic illustration of an embodiment in which one stator member 392 supplants the second and third stator members 286 and 292 respectively, of Figure 18. In sequence from the entrance of the pump member in the direction of fluid circulation, the members are: the pump member 350, the first turbine member 360, the first stator member 380, the second turbine member 368 and the second stator member 392. A one-way device 321, extending from the first stator core 383 to the second stator core 395, prevents backward rotation but permits forward rotation of the first stator member 380.

The major advantage of this arrangement is simplicity. Regarding operation and characteristics, this combination is related to that of Figure 18, as the combination of Figure 17 is related to that of Figure 1.

These embodiments, illustrated in Figures 1, 17, 18 and 19, are specific torque converter combinations, in each of which, a multi-staging arrangement has unique features and characteristics as disclosed and explained throughout this specification, providing high torque ratio near stall, and generally improving efficiency, but especially so, in and near the coupling phase.

Figure 20 is an embodiment having the same combination of bladed members as that of Figure 1, diagrammatically showing modifications of the attachment constructions of some of the members, respective utility depending on the nature of the application environment. Some of these modifications may be used, of course, for embodiments of Figures 17-19, incl.

The members of this combination, in sequence from the entrance of the pump in the direction of circulation, are: the pump member 450, the first turbine member 460, the first stator member 480, the second turbine member 468, the second stator member 486, the third stator member 492, and the third turbine member 474.

This illustration shows the one-way device of the third stator member located at the outer end of the reaction shaft; being, a one-way device 422 interposed between the stationary housing 410 and the reaction shaft element 412. The third stator member 492 is rotationally secured to the inner end of the reaction shaft element; in other words, extending from the third stator shell 494, a hub element 496 is secured by key 497 to race 414 which is splined to reaction shaft element 412. This construction permits the use of a one-way device which inherently has physical proportions inconsistent with the confined space inside the torque converter. Also, this reaction shaft element rotates with the third stator member in the coupling phase; thus, reducing the thrust sliding velocity between the thrust and the retaining surfaces, respectively, of the reaction structure and of the second turbine hub.

The attaching construction for the first stator member 480 is a one-way device 421 extending from the first stator core 483 to the third stator core 495, preventing backward but permitting forward rotation of the first stator member relative to its reaction structure, which structurally includes the third stator member. This arrangement tends to be advantageous for use with heavy duty engines, having medium or low operating speeds. The principal advantage is a matter of balancing thrust forces of the first and the third stator members—near stall, the first and the second stator members exert large thrust forces, axially towards the engine, but that of the third stator member is in opposite direction. Also, the third stator member by virtue of its large blade angles, tends to be torsionally stronger than the second stator member, and hence more suitable for transmitting the reaction torque of the first stator member to the reaction shaft. The major disadvantage is that, the rotational speed differential between the first and third stator members is larger, than that between the first and second stator members, as shown in Figure 5; however, for use with a lower speed power source, this speel differential would be reduced accordingly, retaining reasonable sliding velocities between the elements of one-way device 421.

It may be noted that the second stator member 486 has a single one-way device 423 in this arrangement, in consideration of being relieved of the first stator reaction torque.

As shown, circumferentially spaced screws 465 provide the drive connection between mating parts 464 and 473, respectively, of the first turbine member 460 and the second turbine member 468. This departure from the square-head pins, shown in the preceding embodiments, is largely a matter of preference.

The other structural departure of Figure 20 from Figure 1, is the attaching construction for the third turbine member, which is a rotationally rigid structure uniting the third and the first turbine members. Specifically, the attaching construction comprises a rigid conjunctive structure 420 extending from the third turbine core 477 to the first turbine core 463. As shown for exemplification, it is an annular web cast integrally with the third turbine member 474 and the first turbine member 460. Relative to the embodiments of Figures 1 and 17, the principal advantage of this construction is simplicity, that is, the elimination of a one-way device. Otherwise, this arrangement is less desirable. It tends to have higher shock head losses at the entrances of the third turbine member and the pump member. Also, it does not provide the desirable humpbacked input speed curve; in contrast, the input speed curve has a slight sagging tendency between stall and the coupling point. However, the arrangement is more favorable for automotive applications than arrangements having the fluid discharged directly to the pump entrance from the final stator exit; this interposed turbine member has a rising trend influence on the input speed curve, permitting the pump blades at exit to have a desirable negative angle.

In the discussions of the preceding embodiments, three types of input speed curves were mentioned. These deserve further comment relative to specific fundamental influences. In a torque converter, the rate of circulation naturally has a general decreasing trend from stall to the coupling point. Similarly, this factor would provide a rising pump speed inversely proportional to the rate of circulation. However, it is desirable to have the pump blades at exit disposed at a medium size, negative angle, to avoid an extreme angle of the blades at the entrance of the first turbine member, and to reduce near stall, the conversion of kinetic to pressure energy in the first turbine member. Singularly, a negative disposition of the pump blades at exit, increases the pump speed to offset the circumferential component of the blades. Consequently, for the varying rate of circulation, the influence at stall is greater than at the coupling point; thus, reducing the general rising slope of the input speed curve. Another factor which has an important influence on the input speed curve is the nature of variation of the moment of momentum of the fluid approaching the pump member.

For an arrangement having the final stator member discharging directly to the pump entrance, the moment of momentum of the fluid entering the pump, as a vector quantity, varies from large at stall to small at the coupling point, being proportional to the second power of the rate of circulation. Singularly, this factor influences the input speed curve in the same manner as a backward disposition of the blades at the exit of the pump member. Consequently, for arrangements as shown in Figures 18 and 19, the general slope of the input speed curve naturally is somewhat flat, with a sagging tendency between stall and the coupling point; in fact, the stall speed may actually be higher than the coupling point speed. A rather flat input speed curve is desirable for many heavy duty engine applications. For the many automotive torque converters having direct discharge from the final stator member to the pump member or members, the desirable negative disposition of the blades at the exit of the principal pump is sacrificed, at least to a large degree, to obtain an acceptable rising trend of the input speed curve.

A turbine member, interposed between the final stator and the pump member, and in fixed association with the output power structure, discharges fluid to the pump entrance with a moment of momentum which vectorially increases from stall to the coupling point. This arrangement, shown in Figure 20, provides a rising input speed curve of a pump member having blades with a desirable negative disposition at exit.

A one-way acting turbine member interposed between the final stator member and the pump entrance, as shown in Figures 1 and 17, is the arrangement most desirable for automotive torque converters. It permits a desirable negative disposition of the pump blades at exit, and it provides the humpbacked input speed curve, allowing the engine unusual freedom in the torque conversion range to develop power.

Figure 21 illustrates one embodiment with extensive multi-staging. In sequence from the entrance of the pump member in the normal direction of fluid circulation, the members are: the pump member 550, the first turbine member 560, the first stator member 580, the second turbine member 501, the second stator member 506, the third turbine member 568, the third stator member 508, the fourth turbine member 503, the fourth stator member 586, and the fifth stator member 592.

Each stator member may have a respective one-way device to render it one-way acting, but for practical simplification, members which naturally have similar forward speed characteristics—or may have, with slight changes of blade disposition—are joined together and served with a single one-way device. The fifth stator member 592 has an attaching construction comprising, an attaching flange 596 secured to a one-way device, 522 including a race 514, splined to reaction shaft element 512 which is secured to the stationary housing 510. The fourth stator member has an attaching construction comprising, an attaching element secured to two one-way devices, the common race 514 of which is splined to reaction shaft 512. The two one-way devices are used to provide adequate capacity for the reaction torques of preceding stator members which act through this structure. The third stator member 508 is a preceding stator member in the fluid circuit relative to the fourth stator member 586, being in this case, the nearest preceding stator. It has similar forward speed characteristics and is joined to the fourth stator by element 509.

The second stator member 506 is a subsequent stator relative to the first stator member 580. These particular members tend to have similar forward speed characteristics and are joined together by respective attaching elements 507 and 585. The common attaching construction extends to the fourth stator core 589 and includes one-way device 521.

The turbine members drive through the third turbine member 568 which has an attaching element 572 secured to the driven hub structure 531, keyed (preferably splined) to the output shaft 530. The fourth turbine member 503 is secured by an attaching flange 504 to a mating element 505 associated with the core of the third turbine member. The second turbine member 501 and the first turbine member 560 are secured to a flange element 573 extending outwardly from the third turbine member; the second, by attaching element 502 and the first turbine, by attaching element 564.

The pump driving structure is quite similar to that described for Figure 1.

Obviously, there are many structural variations which could be employed. Also, the arrangement could be varied. Two successive stator members, instead of one, could be interposed between turbine members, or the fourth and the fifth stator members could be replaced with a single member. Furthermore, a one-way acting turbine member could be interposed between the final stator member and the pump member, as in Figure 1, to provide a humpbacked input speed curve.

As shown, the embodiment of Figure 21 has four phases of operation. From stall through the first phase, it is a four-stage torque converter having five stator members contributing reaction torque. The second phase starts when the first and second stator members free-whirl in unisonance. In this phase it is a two-stage torque converter having three active stator members. The third phase begins when the third and the fourth stator members free-whirl together. The third phase is a single-stage operation with only the fifth stator member active. The fourth phase, which is the coupling operation, commences when the fifth stator member free-whirls. Of course, with a respective one-way device for each stator member, there could be more phases with each step having a milder influence.

This embodiment has a stator arrangement with three levels of mechanical advantage in the torque conversion range, generally in accord with the reaction torque requirements, thus providing the required reaction torques with relative low rates of circulation. Unless, an extremely high stall torque ratio is required, the circulation path areas at the exits of the fifth stator and the fourth turbine members, may be made relatively small to reduce the rate of circulation and to aid efficiency near and in the coupling phase, as shown in equation $(k)$ of Figure 26. Most of the shock head losses may be practically eliminated in a large portion of the coupling phase by characterizing most of the stator and turbine members with features, respectively in accordance with equation $(g)$ of Figure 24, and equation $(j)$ of Figure 25.

Hence, the improvements disclosed in this specification, not only provide superior torque converters for light duty usage, such as automotive; but furnishes torque converters for heavy duty applications which are uniquely characterized for high stall torque ratio, and high efficiency in general, but especially in the coupling phase of operation.

Digest

The principal invention of this specification is the concept of fundamental improvements in the performance of various combinations of bladed members constituting hydrodynamic torque converters in general; the performance factors being torque ratio and efficiency in the torque conversion range, and efficiency in the coupling phase of operation.

The conceptive ideas relate, not only to the curtainment of shock head and circulation head losses, but to the attainment of the desired torque multiplication and the power transmission characteristics with unusually low rates of circulation, at least in some phases, but preferably in all phases. A reduction in the rate of circulation reduces the attending circulation head loss and some of the shock head losses. A low rate of circulation is particularly important to minimize the relative influence of the simultaneous circulation and shock head losses— the denominator, to which the head losses are relative is the gross head, which varies inversely as the rate of circulation, and consequently is higher for a low rate of circulation.

The physical modes of attainment include multi-staging, preferably having a plural stator construction with at least one stator member positioned in the outer half of the fluid circuit, and at least one stator member positioned in the inner half. It also includes having each stator member practically one-way acting, firm backwardly but yieldable forwardly. Each of these features, as well as the combination of the particular features, is old in the art; but these features physically characterized and combined with one or more of the improvements disclosed in this specification, are new combinations which are considered novel and unique. Also, the torque converter combinations, having the pump and turbine members correlated with these improved combinations, are considered novel and unique.

This specification comprises several distinct inventions which are closely related, having utility in combination, being in the same classification, in the same status of the art, and involving the same field of search. The concepts and modes of attainment of these inventions may be stated briefly as follows:

Having a free-whirling stator member characterized with physical features so that, under the influence of the circulating fluid, the circumferential velocities of the fluid before and after entrance are synchronized in the coupling phase. The mode of attainment being physical features specified in equation $(g)$ of Figure 24. This improvement is very desirable for outer stator members which free-whirl in several late phases.

For two turbine members interrupted by a free-whirling stator member, having the neighboring features of the turbine members physically characterized, so that in conformity with vortex flow, the circumferential velocities before and after entrance to the following turbine member are synchronized in the coupling phase, the mode of attainment being physical features specified in equation $(j)$ of Figure 25.

Acquiring the desired range of torque conversion with an unusually low rate of circulation is physically achieved by using a circulation path area at the exit of the final stator member and/or the exit of the nearest preceding turbine member, smaller than that in the outer half of the fluid circuit, specifically at the exit of the first outer stator member. The influence of the circulation path area on the rate of circulation at the coupling point is shown by equation $(k)$ of Figure 26. The mode of physical attainment also includes an outer stator member which, not only permits the particular areas reduction, but helps to provide required reaction torque at stall with an unusually low rate of circulation. This generally reduced rate of circulation helps efficiency and grants the pump and turbine members larger radial proportions which obviously are desirable in the coupling phase.

Also, the inventive concept of a heavy duty type of torque converter having a high stall torque ratio and a very efficient coupling phase of operation. Hitherto, these characteristics have not been attained and generally have been considered too conflicting to permit achievement. The mode of attainment is a torque converter having extensive multi-staging and characterized with at least some of the preceding improvements in combination.

So far as I am aware I am the first to have the conception of, or to provide in a hydrodynamic torque converter, either one, or any combination, of the preceding inventions. Hence, I claim these inventions generically in torque converter combinations, individually and in combination with each other. And, I claim these inventions generically in appropriate subcombinations of torque converters.

Also, I claim plural species with each of these inventions individually, and in combination with each other, and with supplementary claims further defining form, structure and/or features.

As has been thoroughly emphasized, the inventions hereof pertain to improvements in hydrodynamic transmission of power, during which, the rate of fluid circulation of a combination of members varies with the phase of operation and the power transmitted, but is maintained in the same general direction with respect to the procession of members in the toroidal circuit; and that direction is referred to as the direction of fluid circulation, or according to SAE recommendations, the "fluid flow direction."

Also, in accordance with the aforestated SAE recommendations, the terms, "first," "second," "third," and "final," are used in the foregoing descriptions and in the appended claims to indicate the sequence of the particular character of member in the fluid flow direction in the recirculating path, referred to as the "circuit," starting at the entrance of the first pump member.

Accordingly, a "preceding" member relative to a specified member means a member which is situated in the fluid circuit ahead of that specified member, that is, is situated from the specified member in the direction counter to the fluid flow direction; and a "subsequent" or "following" member relative to a specified member means a member which is situated in the fluid circuit from the specified member in the same direction as that of the fluid flow.

Similarly, for two "successive" members of like character, such as two successive turbines interrupted by an interposed stator, the two successive turbines are separately referred to as the "preceding" turbine and the "following" turbine, based on the reciprocal relationship in the circuit of one to the other.

The terms, "juxtaposed," "interposed," and "adjacent," are used in the claims in reference to the positioning of bladed-members to indicate sequential position in the procession of bladed-members in the toroidal fluid circuit, rather than the extent of the unoccupied intervening space in the fluid circuit.

In this specification, the usage of the terms "member" and "members" is confined to references to the bladed-members. To eliminate unessential words in the claims, the word "member" is usually omitted where a specific character of member is recited. Accordingly, as used in the claims: "pump" means a pump member; "turbine," a turbine member; and "stator," a stator member.

In conformity with general practice, the phases of operation in the foregoing disclosures are numbered sequentially from stall to the coupling point, the operation thereafter being the coupling phase. Accordingly, in reference to a portion of the torque conversion range of operation, an "early phase" means a phase of operation in the first half of that torque conversion range which starts at stall; and, a "late phase" of torque conversion means a phase of operation in the second half of that torque conversion range which terminates at the coupling point.

It is, of course, understood that the present invention is not limited to the particular forms and structures shown in the drawings, or otherwise revealed, for disclosure and explanatory purposes, but also embraces modifications within the scope of the appended claims.

I claim:

1. In a hydrodynamic torque converter drive having pump, stator, and turbine bladed-members arranged in spaced relationship in a toroidal circuit for fluid recirculation, the combination comprising: a pump situated with its entrance in the inner half and its exit in the outer half of said circuit, and means to connect said pump to an input power structure; a plurality of stators including a first stator situated in the outer half of said circuit and a final stator situated in the inner half of said circuit; reaction structure means to associate said plurality of stators with a stationary support structure to therewith render each stator thereof firm against backward rotation, said reaction structure means including one-way device means arranged to permit forward rotation operative to render each one of said plurality of stators ineffective to vectorially reduce the moment of momentum of circulating fluid, said first stator being thereby and wherefore forwardly rotatable relative to said final stator; a plurality of turbines including and arranged with a first turbine juxtaposed to said pump exit and a final turbine situated with its exit in the inner half of said circuit, and having two successive turbines thereof separated from each other by at least one of said stators; driven structure means to associate said turbines with an output power shaft to therewith afford, for each of said turbines, restraint of forward rotation for the conversion and transmission of energy to said output shaft; and, entrance and exit features of at least one of said stators correlated and related to the environment as set forth in the ensuing equation, wherein the respective environment for each so particularized stator is partially expressed by features of the nearest preceding one of said turbines $$\frac{R_{ptx}}{R_{sn}}\left[2\pi N_t' R_{ptx}+\frac{Q'}{A_{ptx}}\tan B_{ptx}\right]\left[1-\left(\frac{R_{sn}}{R_{sx}}\right)^2\right]-$$

$$\left[\frac{Q'}{A_{sn}}\tan B_{sn}-\frac{R_{sn}}{R_{sx}}\frac{Q'}{A_{sx}}\tan B_{sx}\right]=0\pm 0.3\frac{Q'}{A_{sn}}$$

in which $R_{ptx}$, $R_{sn}$ and $R_{sx}$ are the design radii, ft., $A_{ptx}$, $A_{sn}$ and $A_{sx}$ are the circulation path areas, sq. ft., $B_{ptx}$, $B_{sn}$ and $B_{sx}$ are the blade angles, respectively in each grouping, of said preceding turbine exit, of the particular stator entrance, and of the particular stator exit, and, for wide-open throttle input power operation, $N_t'$ is for said preceding turbine a rotational speed, R. P. S., which is 10 to 20 per cent faster than the coupling point speed thereof, and $Q'$ is the rate of fluid circulation, cu. ft. per sec., concurrent with $N_t'$.

2. The combination defined in claim 1 in which: said plurality of stators includes two unisonant stators which independently tend to rotate forwardly almost simultaneously and approximately in unisonance, one of said unisonant stators being in the inner half of said circuit, and relative to that one, the other being a preceding stator by its position in said circuit; and, said reaction structure means includes means to rotationally secure said unisonant stators together, and a reaction shaft and a one-way device arranged to connect said unisonant stators with said stationary support structure and to therewith prevent backward rotation and permit forward rotation of said unisonant stators.

3. The combination defined in claim 1 in which: said plurality of stators includes two unisonant stators which independently tend to rotate forwardly almost simultaneously and approximately in unisonance, one of said unisonant stators being in the outer half of said circuit, and relative to that one, the other being a subsequent stator by its position in said circuit, and a stator situated in the inner half of said circuit; and, said reaction structure means includes means to rotationally secure said unisonant stators together, and a core situated one-way device adapted to prevent backward rotation and to permit forward rotation of said unisonant stators relative to said stator situated in the inner half of said circuit.

4. The combination defined in claim 1 and including the relationship of circulation path areas in which the average of the exit circulation path area of said final stator and that of the nearest one of said turbines preceding said final stator is 0.60 to 0.90 of the exit circulation path area of said first stator.

5. The combination defined in claim 1 and including particular features of said two successive turbines, said two successive turbines being a preceding turbine and a following turbine by disposition relative to each other, being rotationally united by said driven structure means, and having exit features of said preceding turbine and entrance features of said following turbine correlated and related to the environment as set forth in the ensuing equation $$2\pi N_t' R_{ftn}\left[1-\left(\frac{R_{ptx}}{R_{ftn}}\right)^2\right]-$$

$$\left[\frac{R_{ptx}}{R_{ftn}}\frac{Q'}{A_{ptx}}\tan B_{ptx}-\frac{Q'}{A_{ftn}}\tan B_{ftn}\right]=0\pm 0.3\frac{Q'}{A_{ftn}}$$

in which, $R_{ptx}$ and $R_{ftn}$ are the design radii, ft., $A_{ptx}$ and $A_{ftn}$ are the circulation path areas, sq. ft., and $B_{ptx}$ and $B_{ftn}$ are the blade angles, respectively in each grouping, of said preceding turbine exit, and of said following turbine entrance, and, for wide-open throttle input power operation, $N_t'$ is for said successive turbines a rotational speed, R. P. S., which is 10 to 20 per cent faster than the coupling point speed thereof, and $Q'$ is the rate of fluid circulation, cu. ft. per sec., concurrent with $N_t'$.

6. The combination defined in claim 5 and including the relationship of circulation path areas in which the average of the exit circulation path area of said final stator and that of the nearest one of said turbines preceding said final stator is 0.60 to 0.90 of the exit circulation path area of said first stator.

7. In a hydrodynamic torque converter drive having pump, stator, and turbine bladed-members arranged in spaced relationship in a toroidal circuit for fluid recirculation, the combination comprising: a pump situated with its entrance in the inner half and its exit in the outer half of said circuit, and means to connect said pump to an input power structure; a plurality of stators including a first stator situated in the outer half of said circuit and a final stator situated in the inner half of said circuit; reaction structure means to associate said plurality of stators with a sationary support structure to therewith render each stator thereof firm against backward rotation, said reaction structure means including one-way device means arranged to permit forward rotation operative to render each one of said plurality of stators ineffective to vectorially reduce the moment of momentum of circulating fluid, said first stator being thereby and wherefore forwardly rotatable relative to said final stator; a plurality of turbines including and arranged with a first turbine juxtaposed to said pump exit and a final turbine situated with its exit in the inner half of said circuit, and having two successive turbines thereof separated from each other by at least one of said stators; driven structure means to associate said turbines with an output power shaft to therewith afford, for each of said turbines, restraint of forward rotation for the conversion and transmission of energy to said output shaft; and, particular features of said two successive turbines, said two successive turbines being a preceding and a following turbine by disposition relative to each other, being rotationally united by said driven structure means, and having exit features of said preceding turbine and entrance features of said following turbine correlated and related to the environment as set forth in the ensuing equation $$2\pi N_t' R_{ftn}\left[1-\left(\frac{R_{ptx}}{R_{ftn}}\right)^2\right]-$$
$$\left[\frac{R_{ptx}}{R_{ftn}}\frac{Q'}{A_{ptx}}\tan B_{ptx}-\frac{Q'}{A_{ftn}}\tan B_{ftn}\right]=0\pm 0.3\frac{Q'}{A_{ftn}}$$

in which, $R_{ptx}$ and $R_{ftn}$ are the design radii, ft., $A_{ptx}$ and $A_{ftn}$ are the circulation path areas, sq. ft., and $B_{ptx}$ and $B_{ftn}$ are the blade angles, respectively in each grouping, of said preceding turbine exit, and of said following turbine entrance, and, for wide-open throttle input power operation, $N_t'$ is for said successive turbines a rotational speed, R. P. S., which is 10 to 20 per cent faster than the coupling point speed thereof, and $Q'$ is the rate of fluid circulation, cu. ft. per sec., concurrent with $N_t'$.

8. The combination defined in claim 7 and including the relationship of circulation path areas in which the average of the exit circulation path area of said final stator and that of the nearest one of said turbines preceding said final stator is 0.60 to 0.90 of the exit circulation path area of said first stator.

9. In a hydrodynamic torque converter drive having pump, stator, and turbine bladed-members arranged in spaced relationship in a toroidal circuit for fluid recirculation, the combination comprising: a pump situated with its entrance in the inner half and its exit in the outer half of said circuit, and means to connect said pump to an input power structure; a plurality of stators including a first stator situated in the outer half of said circuit and a final stator situated in the inner half of said circuit; reaction structure means to associate said plurality of stators with a stationary support structure to therewith render each stator thereof firm against backward rotation, said reaction structure means including one-way device means arranged to permit forward rotation operative to render each one of said plurality of stators ineffective to vectorially reduce the moment of momentum of circulating fluid, said first stator being thereby and wherefore forwardly rotatable relative to said final stator; a plurality of turbines including and arranged with a first turbine juxtaposed to said pump exit and a final turbine situated with its exit in the inner half of said circuit, and having two successive turbines thereof separated from each other by at least one of said stators; driven structure means to associate said turbines with an output power shaft to therewith afford, for each of said turbines, restraint of forward rotation for the conversion and transmission of energy to said output shaft; and, the relationship of circulation path areas in which the average of the exit circulation path area of said final stator and that of the nearest one said turbines preceding said final stator is 0.60 to 0.90 of the exit circulation path area of said first stator.

10. In a hydrodynamic torque converter drive having pump, stator, and turbine bladed-members arranged in spaced relationship in a toroidal circuit for fluid recirculation, the combination comprising: an outer stator situated in the outer half of said circuit and near to the exit thereat of a preceding turbine; an inner stator situated in the inner half of said circuit and near to the exit thereat of a preceding turbine; reaction structure means to associate said inner and outer stators with a stationary support structure to therewith render each of said stators firm against backward rotation, said reaction structure means including one-way device means to permit forward rotation of said inner and outer stators and to permit forward rotation of said outer stator relative to said inner stator; and, entrance and exit features of at least one of said inner and outer stators correlated and related to the environment as set forth in the ensuing equation, wherein the respective environment for each so particularized stator is partially expressed by features of the nearest preceding turbine $$\frac{R_{ptx}}{R_{sn}}\left[2\pi N_t' R_{ptx}+\frac{Q'}{A_{ptx}}\tan B_{ptx}\right]\left[1-\left(\frac{R_{sn}}{R_{sx}}\right)^2\right]-$$
$$\left[\frac{Q'}{A_{sn}}\tan B_{sn}-\frac{R_{sn}}{R_{sx}}\frac{Q'}{A_{sx}}\tan B_{sx}\right]=0\pm 0.3\frac{Q'}{A_{sn}}$$

in which, $R_{ptx}$, $R_{sn}$ and $R_{sx}$ are the design radii, ft., $A_{ptx}$, $A_{sn}$ and $A_{sx}$ are the circulation path areas, sq. ft., $B_{ptx}$, $B_{sn}$ and $B_{sx}$ are the blade angles, respectively in each grouping, of said preceding turbine exit, of the particular stator entrance, and of the particular stator exit, and, for wide-open throttle input power operation, $N_t'$ is for said preceding turbine a rotational speed, R. P. S., which is 10 to 20 per cent faster than the coupling point speed thereof, and $Q'$ is the rate of fluid circulation, cu. ft. per sec., concurrent with $N_t'$.

11. The combination defined in claim 10 in which, based on the direction of fluid flow, said outer stator is the first stator and said inner stator is the final stator in the energy extraction portion of said circuit; and said stator features include the relationship of the exit circulation path area of said inner stator being 0.60 to 0.90 of the exit circulation path area of said outer stator.

12. In a hydrodynamic torque converter drive having pump, stator, and turbine bladed-members arranged in spaced relationship in a toroidal circuit for fluid recirculation, the combination comprising: two successive turbines situated in said circuit with an intervening space adaptable for at least one forwardly rotatable stator, said successive turbines being a preceding turbine and a following turbine by disposition relative to each other; driven structure means to associate said successive turbines with an output power shaft to therewith afford restraint of forward rotation for the conversion and transmission of energy to said output shaft, said driven structure means including means to rotationally unite said successive turbines; and, exit features of said preceding turbine and entrance features of said following turbine correlated and related to the environment as set forth in the ensuing equation $$2\pi N_t' R_{ftn}\left[1-\left(\frac{R_{ptx}}{R_{ftn}}\right)^2\right]-\left[\frac{R_{ptx}}{R_{ftn}}\frac{Q'}{A_{ptx}}\tan B_{ptx}-\frac{Q'}{A_{ftn}}\tan B_{ftn}\right]=0\pm 0.3\frac{Q'}{A_{ftn}}$$

in which, $R_{ptx}$ and $R_{ftn}$ are the design radii, ft., $A_{ptx}$ and $A_{ftn}$ are the circulation path areas, sq. ft., and $B_{ptx}$ and $B_{ftn}$ are the blade angles, respectively in each grouping, of said preceding turbine exit, and of said following turbine entrance, and, for wide-open throttle input power operation, $N_t'$ is for said successive turbines a rotational speed, R. P. S., which is 10 to 20 per cent faster than the coupling point speed thereof, and $Q'$ is the rate of fluid circulation, cu. ft. per sec., concurrent with $N_t'$.

13. In a hydrodynamic torque converter drive having pump, stator, and turbine bladed-members arranged in spaced relationship in a toroidal circuit for fluid recirculation, the combination comprising: an outer stator situated in the outer half of said circuit, and an inner stator situated in the inner half of said circuit, said outer stator being the first stator and said inner stator being the final stator in the energy extraction portion of said circuit, in accordance with the direction of fluid flow; reaction structure means to associate said inner and outer stators with a stationary support structure to therewith render each of said stators firm against backward rotation, said reaction structure means including one-way device means to permit forward rotation of said inner and outer stators including forward rotation of said outer stator relative to said inner stator; and, the relationship of the exit circulation path area of said inner stator being 0.60 to 0.90 of the exit circulation path area of said outer stator.

14. In a hydrodynamic torque converter drive having bladed-members, one pump, three stators, and three turbines, arranged in spaced relationship in a toroidal circuit for fluid recirculation, the combination comprising: a pump situated with its entrance in the inner half and its exit in the outer half of said circuit, and means to connect said pump to an input power structure; a first stator situated in the outer half of said circuit with an interrupted space between its entrance and said pump exit; a second stator situated in the inner half of said circuit with two interrupted spaces between its exit and said pump entrance; a third stator situated in the inner half of said circuit with its entrance adjacent to said second stator exit; reaction structure means to associate said stators with a stationary support structure to therewith render each of said stators firm against backward rotation, said reaction structure means including one-way device means arranged to permit forward rotation operative to render each one of said stators ineffective to vectorially reduce the moment of momentum of circulating fluid, said first stator being thereby and wherefore forwardly rotatable relative to said third stator; a first turbine interposed between said pump exit and said first stator entrance; a second turbine situated with its entrance adjacent to the exit of said first stator and its exit adjacent to the entrance of said second stator; a third turbine interposed between the exit of said third stator and said pump entrance; driven structure means to associate said turbines with an output power shaft to therewith afford, for each of said turbines, restraint of forward rotation for the conversion and transmission of energy to said output shaft; and, entrance and exit features of at least one of said stators correlated and related to the environment as set forth in the ensuing equation, wherein the respective environment for each so particularized stator is partially expressed by features of the nearest preceding one of said turbines $$\frac{R_{ptx}}{R_{sn}}\left[2\pi N_t' R_{ptx}+\frac{Q'}{A_{ptx}}\tan B_{ptx}\right]\left[1-\left(\frac{R_{sn}}{R_{sx}}\right)^2\right]-$$
$$\left[\frac{Q'}{A_{sn}}\tan B_{sn}-\frac{R_{sn}}{R_{sx}}\frac{Q'}{A_{sx}}\tan B_{sx}\right]=0\pm 0.3\frac{Q'}{A_{sn}}$$

in which, $R_{ptx}$, $R_{sn}$ and $R_{sx}$ are the design radii, ft., $A_{ptx}$, $A_{sn}$ and $A_{sx}$ are the circulation path areas, sq. ft., $B_{ptx}$, $B_{sn}$ and $B_{sx}$ are the blade angles, respectively in each grouping, of said preceding turbine exit, of the particular stator entrance, and of the particular stator exit, and, for wide-open throttle input power operation, $N_t'$ is for said preceding turbine a rotational speed, R. P. S., which is 10 to 20 per cent faster than the coupling point speed thereof, and $Q'$ is the rate of fluid circulation, cu. ft. per sec., concurrent with $N_t'$.

15. The combination defined in claim 14 in which said reaction structure means includes: a reaction shaft and a one-way device arranged to connect said third stator with said stationary support structure and to therewith prevent backward rotation and permit forward rotation of said third stator; a one-way device adapted to prevent backward rotation and to permit forward rotation of said second stator relative to said reaction shaft; and, a core situated one-way device operative for said first stator to prevent backward rotation relative to one, and to permit forward rotation relative to both, of said second and said third stators.

16. The combination defined in claim 14 in which said driven structure means includes a driven element extending from a core element of said third turbine to a core element of said first turbine, said driven element including a one-way device interposed therein and operative therewith to permit backward rotation and to prevent forward rotation of said third turbine relative to said first turbine.

17. The combination defined in claim 14 and including the relationship of circulation path areas in which the average of the exit circulation path area of said third stator and that of said second turbine is 0.60 to 0.90 of the exit circulation path area of said first stator.

18. The combination defined in claim 14 in which said driven structure means include means to rotationally unite said first and said second turbines; and, in which the exit features of said first turbine and the entrance features of said second turbine are correlated and related to the environment as set forth in the ensuing equation, wherein, by disposition relative to each other, said first turbine is the preceding turbine, said second turbine is the following turbine, and together are successive turbines $$2\pi N_t' R_{ftn}\left[1-\left(\frac{R_{ptx}}{R_{ftn}}\right)^2\right]-$$
$$\left[\frac{R_{ptx}}{R_{ftn}}\frac{Q'}{A_{ptx}}\tan B_{ptx}-\frac{Q'}{A_{ftn}}\tan B_{ftn}\right]=0\pm 0.3\frac{Q'}{A_{ftn}}$$

in which, $R_{ptx}$ and $R_{ftn}$ are the design radii, ft., $A_{ptx}$ and $A_{ftn}$ are the circulation path areas, sq. ft., and $B_{ptx}$ and $B_{ftn}$ are the blade angles, respectively in each grouping, of said preceding turbine exit, and of said following turbine entrance, and, for wide-open throttle input power operation, $N_t'$ is for said successive turbines a rotational speed, R. P. S., which is 10 to 20 per cent faster than the coupling point speed thereof, and $Q'$ is the rate of fluid circulation, cu. ft. per sec., concurrent with $N_t'$.

19. The combination defined in claim 18 and including the relationship of circulation path areas in which the average of the exit circulation path area of said third stator and that of said second turbine is 0.60 to 0.90 of the exit circulation path area of said first stator.

20. In a hydrodynamic torque converter drive having bladed-members, one pump, three stators, and three turbines, arranged in spaced relationship in a toroidal circuit for fluid recirculation, the combination comprising: a pump situated with its entrance in the inner half and its exit in the outer half of said circuit, and means to connect said pump to an input power structure; a first stator situated in the outer half of said circuit with an interrupted space between its entrance and said pump exit; a second stator situated in the inner half of said circuit with two interrupted spaces between its exit and said pump entrance; a third stator situated in the inner half of said circuit with its entrance adjacent to said second stator exit; reaction structure means to associate said stators with a stationary support structure to therewith render each of said stators firm against backward rotation, said reaction structure means including one-way device means arranged to permit forward rotation operative to render each one of said stators ineffective to vectorially reduce the moment of momentum of circulating fluid, said first stator being thereby and wherefore forwardly rotatable relative to said third stator; a first turbine interposed between said pump exit and said first stator entrance; a second turbine situated with its entrance adjacent to the exit of said first stator and its exit adjacent to the entrance of said second stator; a third turbine interposed between the exit of said third stator and said pump entrance; driven structure means to associate said turbines with an output power shaft to therewith afford, for each of said turbines, restraint of forward rotation for the conversion and transmission of energy to said output shaft, said driven structure means including means to rotationally unite said first and said second tubines; and, exit features of said first turbine and entrance features of said second turbine correlated and related to the environment as set forth in the ensuing equation, wherein, by disposition relative to each other, said first turbine is the preceding turbine, said second turbine is the following turbine, and together are successive turbines $$2\pi N_t' R_{ftn}\left[1-\left(\frac{R_{ptx}}{R_{ftn}}\right)^2\right]-\left[\frac{R_{ptx}}{R_{ftn}}\frac{Q'}{A_{ptx}}\tan B_{ptx}-\frac{Q'}{A_{ftn}}\tan B_{ftn}\right]=0\pm0.3\frac{Q'}{A_{ftn}}$$

in which, $R_{ptx}$ and $R_{ftn}$ are the design radii, ft., $A_{ptx}$ and $A_{ftn}$ are the circulation path areas, sq. ft., and $B_{ptx}$ and $B_{ftn}$ are the blade angles, respectively in each grouping, of said preceding turbine exit, and of said following turbine entrance, and, for wide-open throttle input power operation, $N_t'$ is for said successive turbines a rotational speed, R. P. S., which is 10 to 20 per cent faster than the coupling point speed thereof, and $Q'$ is the rate of fluid circulation, cu. ft. per sec., concurrent with $N_t'$.

21. The combination defined in claim 20 in which said reaction structure means includes: a reaction shaft and a one-way device arranged to connect said third stator with said stationary support structure and to therewith prevent backward rotation and permit forward rotation of said third stator; a one-way device adapted to prevent backward rotation and to permit forward rotation of said second stator relative to said reaction shaft; and, a core situated one-way device operative for said first stator to prevent backward rotation relative to one, and to permit forward rotation relative to both, of said second and said third stators.

22. The combination defined in claim 20 in which said driven structure means includes a driven element extending from a core element of said third turbine to a core element of said first turbine, said driven element including a one-way device interposed therein and operative therewith to permit backward rotation and to prevent forward rotation of said third turbine relative to said first turbine.

23. The combination defined in claim 20 and including the relationship of circulation path areas in which the average of the exit circulation path area of said third stator and that of said second turbine is 0.60 to 0.90 of the exit circulation path area of said first stator.

24. In a hydrodynamic torque converter drive having bladed-members, one pump, three stators, and three turbines, arranged in spaced relationship in a toroidal circuit for fluid recirculation, the combination comprising: a pump situated with its entrance in the inner half and its exit in the outer half of said circuit, and means to connect said pump to an input power structure; a first stator situated in the outer half of said circuit with an interrupted space between its entrance and said pump exit; a second stator situated in the inner half of said circuit with two interrupted spaces between its exit and said pump entrance; a third stator situated in the inner half of said circuit with its entrance adjacent to said second stator exit; reaction structure means to associate said stators with a stationary support structure to therewith render each of said stators firm against backward rotation, said reaction structure means including one-way device means arranged to permit forward rotation operative to render each one of said stators ineffective to vectorially reduce the moment of momentum of circulating fluid, said first stator being thereby and wherefore forwardly rotatable relative to said third stator; a first turbine interposed between said pump exit and said first stator entrance; a second turbine situated with its entrance adjacent to the exit of said first stator and its exit adjacent to the entrance of said second stator; a third turbine interposed between the exit of said third stator and said pump entrance; driven structure means to associate said turbines with an output power shaft to therewith afford, for each of said turbines, restraint of forward rotation for the conversion and transmission of energy to said output shaft; and, the relationship of circulation path areas in which the average of the exit circulation path area of said third stator and that of said second turbine is 0.60 to 0.90 of the exit circulation path area of said first stator.

25. The combination defined in claim 24 in which said reaction structure means includes: a reaction shaft and a one-way device arranged to connect said third stator with said stationary support structure and to therewith prevent backward rotation and permit forward rotation of said third stator; a one-way device adapted to prevent backward rotation and to permit forward rotation of said second stator relative to said reaction shaft; and, a core situated one-way device operative for said first stator to prevent backward rotation relative to one, and to permit forward rotation relative to both, of said second and said third stators.

26. The combination defined in claim 24 in which said driven structure means includes a driven element extending from a core element of said third turbine to a core element of said first turbine, said driven element including a one-way device interposed therein and operative therewith to permit backward rotation and to prevent forward rotation of said third turbine relative to said first turbine.

27. In a hydrodynamic torque converter drive having bladed-members, one pump, two stators, and three turbines, arranged in spaced relationship in a toroidal circuit for fluid recirculation, the combination comprising: a pump situated with its entrance in the inner half and its exit in the outer half of said circuit, and means to connect said pump to an input power structure; a first stator situated in the outer half of said circuit with an interrupted space between its entrance and said pump exit; a second stator situated in the inner half of said circuit with an interrupted space between its exit and said pump entrance; reaction structure means to associate said stators with a stationary support structure to therewith render each of said stators firm against backward rotation, said reaction structure means including one-way device means arranged to permit forward rotation operative to render each one of said stators ineffective to vectorially reduce the moment of momentum of circulating fluid, said first stator being thereby and wherefore forwardly rotatable relative to said second stator; a first turbine interposed between said pump exit and said first stator entrance; a second turbine situated with its entrance adjacent to the exit of said first stator and its exit adjacent to the entrance of said second stator; a third turbine interposed between said second stator exit and said pump entrance; driven structure means to associate said turbines with an output power shaft to therewith afford, for each of said turbines, restraint of forward rotation for the conversion and transmission of energy to said output shaft; and, entrance and exit features of at least one of said stators correlated and related to the environment as set forth in the ensuing equation, wherein the respective environment for each so particularized stator is partially expressed by features of the nearest preceding one of said turbines $$\frac{R_{ptx}}{R_{sn}}\left[2\pi N_t' R_{ptx} + \frac{Q'}{A_{ptx}} \tan B_{ptx}\right]\left[1-\left(\frac{R_{sn}}{R_{sx}}\right)^2\right]-$$
$$\left[\frac{Q'}{A_{sn}} \tan B_{sn} - \frac{R_{sn}}{R_{sx}} \frac{Q'}{A_{sx}} \tan B_{sx}\right] = 0 \pm 0.3 \frac{Q'}{A_{sn}}$$

in which, $R_{ptx}$, $R_{sn}$ and $R_{sx}$ are the design radii, ft., $A_{ptx}$, $A_{sn}$ and $A_{sx}$ are the circulation path areas, sq. ft., $B_{ptx}$, $B_{sn}$ and $B_{sx}$ are the blade angles, respectively in each grouping, of said preceding turbine exit, of the particular stator entrance, and of the particular stator exit, and, for wide-open throttle input power operation, $N_t'$ is for said preceding turbine a rotational speed, R. P. S., which is 10 to 20 per cent faster than the coupling point speed thereof, and $Q'$ is the rate of fluid circulation, cu. ft. per sec., concurrent with $N_t'$.

28. The combination defined in claim 27 in which said reaction structure means includes: a reaction shaft and a one-way device arranged to connect said second stator with said stationary support structure and to therewith prevent backward rotation and permit forward rotation of said second stator; and, a one situated one-way device adapted to prevent backward rotation and to permit forward rotation of said first stator relative to said second stator.

29. The combination defined in claim 29 in which said driven structure means includes a driven element extending from a core element of said third turbine to a core element of said first turbine, said driven element including a one-way device interposed therein and operative therewith to permit backward rotation and to prevent forward rotation of said third turbine relative to said first turbine.

30. The combination defined in claim 27 and including the relationship of circulation path areas in which the average of the exit circulation path area of said second stator and that of said second turbine is 0.60 to 0.90 of the exit circulation path area of said first stator.

31. The combination defined in claim 27 in which said driven structure means includes means to rotationally unite said first and said second turbines; and, in which the exit features of said first turbine and the entrance features of said second turbine are correlated and related to the environment as set forth in the ensuing equation, wherein, by disposition relative to each other, said first turbine is the preceding turbine, said second turbine is the following turbine, and together are successive turbines $$2\pi N_t' R_{ftn}\left[1-\left(\frac{R_{ptx}}{R_{ftn}}\right)^2\right]-$$
$$\left[\frac{R_{ptx}}{R_{ftn}} \frac{Q'}{A_{ptx}} \tan B_{ptx} - \frac{Q'}{A_{ftn}} \tan B_{ftn}\right] = 0 \pm 0.3 \frac{Q'}{A_{ftn}}$$

in which, $R_{ptx}$ and $R_{ftn}$ are the design radii, ft., $A_{ptx}$ and $A_{ftn}$ are the circulation path areas, sq. ft., and $B_{ptx}$ and $B_{ftn}$ are the blade angles, respectively in each grouping, of said preceding turbine exit, and of said following turbine entrance, and, for wide-open throttle input power operation, $N_t'$ is for said successive turbines a rotational speed, R. P. S., which is 10 to 20 per cent faster than the coupling point speed thereof, and $Q'$ is the rate of fluid circulation, cu. ft. per sec., concurrent with $N_t'$.

32. The combination defined in claim 31 and including the relationship of circulation path areas in which the average of the exit circulation path area of said second stator and that of said second turbine is 0.60 to 0.90 of the exit circulation path area of said first stator.

33. In a hydrodynamic torque converter drive having bladed-members, one pump, two stators, and three turbines, arranged in spaced relationship in a toroidal circuit for fluid recirculation, the combination comprising: a pump situated with its entrance in the inner half and its exit in the outer half of said circuit, and means to connect said pump to an input power structure; a first stator situated in the outer half of said circuit with an interrupted space between its entrance and said pump exit; a second stator situated in the inner half of said circuit with an interrupted space between its exit and said pump entrance; reaction structure means to associate said stators with a stationary support structure to therewith render each of said stators firm against backward rotation, said reaction structure means including one-way device means arranged to permit forward rotation operative to render each one of said stators ineffective to vectorially reduce the moment of momentum of circulating fluid, said first stator being thereby and wherefore forwardly rotatable relative to said second stator; a first turbine interposed between said pump exit and said first stator entrance; a second turbine situated with its entrance adjacent to the exit of said first stator and its exit adjacent to the entrance of said second stator; a third turbine interposed between said second stator exit and said pump entrance; driven structure means to associate said turbines with an output power shaft to therewith afford, for each of said turbines, restraint of forward rotation for the conversion and transmission of energy to said output shaft, said driven structure means including means to rotationally unite said first and said second turbines; and, exit features of said first turbine and entrance features of said second turbine correlated and related to the environment as set forth in the ensuing equation, wherein, by disposition relative to each other, said first turbine is the preceding turbine, said second turbine is the following turbine, and together are successive turbines $$2\pi N_t' R_{ftn}\left[1-\left(\frac{R_{ptx}}{R_{ftn}}\right)^2\right]-$$
$$\left[\frac{R_{ptx}}{R_{ftn}} \frac{Q'}{A_{ptx}} \tan B_{ptx} - \frac{Q'}{A_{ftn}} \tan B_{ftn}\right] = 0 \pm 0.3 \frac{Q'}{A_{ftn}}$$

in which, $R_{ptx}$ and $R_{ftn}$ are the design radii, ft., $A_{ptx}$ and $A_{ftn}$ are the circulation path areas, sq. ft., and $B_{ptx}$ and $B_{ftn}$ are the blade angles, respectively in each grouping, of said preceding turbine exit, and of said following turbine entrance, and, for wide-open throttle input power operation, $N_t'$ is for said successive turbines a rotational speed, R. P. S., which is 10 to 20 per cent faster than the coupling point speed thereof, and $Q'$ is the rate of fluid circulation, cu. ft. per sec., concurrent with $N_t'$.

34. The combination defined in claim 33 in which said reaction structure means includes: a reaction shaft and a one-way device arranged to connect said second stator with said stationary support structure and to therewith prevent backward rotation and permit forward rotation of said second stator; and, a core situated one-way device adapted to prevent backward rotation and to permit forward rotation of said first stator relative to said second stator.

35. The combination defined in claim 33 in which said driven structure means includes a driven element extending from a core element of said third turbine to a core element of said first turbine, said driven element including a one-way device interposed therein and operative therewith to permit backward rotation and to prevent forward rotation of said third turbine relative to said first turbine.

36. The combination defined in claim 33 and including the relationship of circulation path areas in which the average of the exit circulation path area of said second stator and that of said second turbine is 0.60 to 0.90 of the exit circulation path area of said first stator.

37. In a hydrodynamic torque converter drive having bladed-members, one pump, two stators, and three turbines, arranged in spaced relationship in a toroidal circuit for fluid recirculation, the combination comprising: a pump situated with its entrance in the inner half and its exit in the outer half of said circuit, and means to connect said pump to an input power structure; a first stator situated in the outer half of said circuit with an interrupted space between its entrance and said pump exit; a second stator situated in the inner half of said circuit with an interrupted space between its exit and said pump entrance; reaction structure means to associate said stators with a stationary support structure to therewith render each of said stators firm against backward rotation, said reaction structure means including one-way device means arranged to permit forward rotation operative to render each one of said stators ineffective to vectorially reduce the moment of momentum of circulating fluid, said first stator being thereby and wherefore forwardly rotatable relative to said second stator; a first turbine interposed between said pump exit and said first stator entrance; a second turbine situated with its entrance adjacent to the exit of said first stator and its exit adjacent to the entrance of said second stator; a third turbine interposed between said second stator exit and said pump entrance; driven structure means to associate said turbines with an output power shaft to therewith afford, for each of said turbines, restraint of forward rotation for the conversion and transmission of energy to said output shaft; and, the relationship of circulation path areas in which the average of the exit circulation path area of said second stator and that of said second turbine is 0.60 to 0.90 of the exit circulation path area of said first stator.

38. The combination defined in claim 37 in which said reaction structures means includes: a reaction shaft and a one-way device arranged to connect said second stator with said stationary support structure and to therewith prevent backward rotation and permit forward rotation of said second stator; and, a core situated one-way device adapted to prevent backward rotation and to permit forward rotation of said first stator relative to said second stator.

39. The combination defined in claim 37 in which said driven structure means includes a driven element extending from a core element of said third turbine to a core element of said first turbine, said driven element including a one-way device interposed therein and operative therewith to permit backward rotation and to prevent forward rotation of said third turbine relative to said first turbine.

40. In a hydrodynamic torque converter drive having bladed-members, one pump, three stators, and two turbines, arranged in spaced relationship in a toroidal circuit for fluid recirculation, the combination comprising: a pump situated with its entrance in the inner half and its exit in the outer half of said circuit, and means to connect said pump to an input power structure; a first stator situated in the outer half of said circuit with an interrupted space between its entrance and said pump exit; a second stator situated in the inner half of said circuit with an interrupted space between its exit and said pump entrance; a third stator interposed between said second stator exit and said pump entrance; reaction structure means to associate said stators with a stationary support structure to therewith render each of said stators firm against backward rotation, said reaction structure means including one-way device means arranged to permit forward rotation operative to render each one of said stators ineffective to vectorially reduce the moment of momentum of circulating fluid, said first stator being thereby and wherefore forwardly rotable relative to said third stator; a first turbine interposed between said pump exit and said first stator entrance; a second turbine situated with its entrance adjacent to the exit of said first stator and its exit adjacent to the entrance of said second stator; driven structure means to associate said turbines with an output power shaft to therewith afford, for each of said turbines, restraint of forward rotation for the conversion and transmission of energy to said output shaft; and, entrance and exit features of at least one of said stators correlated and related to the environment as set forth in the ensuing equation, wherein the respective environment for each so particularized stator is partially expressed by features of the nearest preceding one of said turbines.

$$\frac{R_{ptx}}{R_{sn}}\left[2\pi N_t' R_{ptx} + \frac{Q'}{A_{ptx}} \tan B_{ptx}\right]\left[1-\left(\frac{R_{sn}}{R_{sx}}\right)^2\right] - \left[\frac{Q'}{A_{sn}} \tan B_{sn} - \frac{R_{sn}}{R_{sx}} \frac{Q'}{A_{sx}} \tan B_{sx}\right] = 0 \pm 0.3 \frac{Q'}{A_{sn}}$$

in which, $R_{ptx}$, $R_{sn}$ and $R_{sx}$ are the design radii, ft., $A_{ptx}$, $A_{sn}$ and $A_{sx}$ are the circulation path areas, sq. ft., $B_{pxt}$, $B_{sn}$ and $B_{sx}$ are the blade angles, respectively in each grouping, of said preceding turbine exit, of the particular stator entrance, and of the particular stator exit, and, for wide-open throttle input power operation, $N_t'$ is for said preceding turbine a rotational speed, R. P. S., which is 10 to 20 per cent faster than the coupling point speed thereof, and $Q'$ is the rate of fluid circulation, cu. ft. per sec., concurrent with $N_t'$.

41. The combination defined in claim 40 in which said reaction structure means includes: a reaction shaft and a one-way device arranged to connect said third stator with said stationary support structure and to therewith prevent backward rotation and permit forward rotation of said third stator; a one-way device adapted to prevent backward rotation and to permit forward rotation of said second stator relative to said reaction shaft; and, a core situated one-way device operative for said first stator to prevent backward rotation relative to one, and to permit forward rotation relative to both, of said second and said third stators.

42. The combination defined in claim 40 and including the relationship of circulation path areas in which the average of the exit circulation path area of said third stator and that of said second turbine is 0.60 to 0.90 of the exit circulation path area of said first stator.

43. The combination defined in claim 40 in which said driven structure means includes means to rotationally unite said first and said second turbines; and, in which the exit features of said first turbine and the entrance features of said second turbine are correlated and related to the environment as set forth in the ensuing equation, wherein, by disposition relative to each other, said first turbine is the preceding turbine, said second turbine is the following turbine, and together are successive turbines:

$$2\pi N_t' R_{ftn}\left[1-\left(\frac{R_{ptx}}{R_{ftn}}\right)^2\right] - \left[\frac{R_{ptx}}{R_{ftn}} \frac{Q'}{A_{ptx}} \tan B_{ptx} - \frac{Q'}{A_{ftn}} \tan B_{ftn}\right] = 0 \pm 0.3 \frac{Q'}{A_{ftn}}$$

in which, $R_{pxt}$ and $R_{ftn}$ are the design radii, ft., $A_{ptx}$ and $A_{ftn}$ are the circulation path areas, sq. ft., and $B_{ptx}$ and $B_{ftn}$ are the blade angles, respectively in each grouping, of said preceding turbine exit, and of said following turbine entrance, and, for wideopen throttle input power operation, $N_t'$ is for said successive turbines a rotational speed, R. P. S., which is 10 to 20 per cent faster than the coupling point speed thereof, and $Q'$ is the rate of fluid circulation, cu. ft. per sec., concurrent with $N_t'$.

44. The combination defined in claim 43 and including the relationship of circulation path areas in which the average of the exit circulation path area of said third stator and that of said second turbine is 0.60 to 0.90 of the exit circulation path area of said first stator.

45. In a hydrodynamic torque converter drive having bladed-members, one pump, three stators, and two turbines, arranged in spaced relationship in a toroidal circuit for fluid recirculation, the combination comprising: a pump situated with its entrance in the inner half and its exit in the outer half of said circuit, and means to connect said pump to an input power structure; a first stator situated in the outer half of said circuit with an interrupted space between its entrance and said pump exit; a second stator situated in the inner half of said circuit with an interrupted space between its exit and said pump entrance; a third stator interposed between said second stator exit and said pump entrance; reaction structure means to associate said stators with a stationary support structure to therewith render each of said stators firm against backward rotation, said reaction structure means including one-way device means arranged to permit forward rotation operative to render each one of said stators ineffective to vectorially reduce the moment of momentum of circulating fluid, said first stator being thereby and wherefore forwardly rotable relative to said third stator; a first turbine interposed between said pump exit and said first stator entrance; a second turbine situated with its entrance adjacent to the exit of said first stator and its exit adjacent to the entrance of said second stator; driven structure means to associate said turbines with an output power shaft to therewith afford, for each of said turbines, restraint of forward rotation for the conversion and transmission of energy to said output shaft, said driven structure means including means to rotationally unite said first and said second turbines; and, exit features of said first turbine and entrance features of said second turbine correlated and related to the environment as set forth in the ensuing equation, wherein, by disposition relative to each other, said first turbine is the preceding turbine, said second turbine is the following turbine, and together are successive turbines $$2\pi N_t' R_{ftn}\left[1-\left(\frac{R_{ptx}}{R_{ftn}}\right)^2\right]-$$

$$\left[\frac{R_{ptx}}{R_{ftn}}\frac{Q'}{A_{ptx}}\tan B_{ptx}-\frac{Q'}{A_{ftn}}\tan B_{ftn}\right]=0\pm 0.3\frac{Q'}{A_{ftn}}$$

in which, $R_{ptx}$ and $R_{ftn}$ are the design radii, ft., $A_{ptx}$ and $A_{ftn}$ are the circulation path areas, sq. ft., and $B_{ptx}$ and $B_{ftn}$ are the blade angles, respectively in each grouping, of said preceding turbine exit, and of said following turbine entrance, and, for wide-open throttle input power operation, $N_t'$ is for said successive turbines a rotational speed, R. P. S., which is 10 to 20 per cent faster than the coupling point speed thereof, and $Q'$ is the rate of fluid circulation, cu. ft. per sec., concurrent with $N_t'$.

46. The combination defined in claim 45 in which said reaction structure means includes: a reaction shaft and a one-way device arranged to connect said third stator with said stationary support structure and to therewith prevent backward rotation and permit forward rotation of said third stator; a one-way device adapted to prevent backward rotation and to permit forward rotation of said second stator relative to said reaction shaft; and, a core situated one-way device operative for said first stator to prevent backward rotation relative to one, and to permit forward rotation relative to both, of said second and said third stators.

47. The combination defined in claim 45 and including the relationship of circulation path areas in which the average of the exit circulation path area of said third stator and that of said second turbine is 0.60 to 0.90 of the exit circulation path area of said first stator.

48. In a hydrodynamic torque converter drive having bladed-members, one pump, three stators, and two turbines, arranged in spaced relationship in a toroidal circuit for fluid recirculation, the combination comprising: a pump situated with its entrance in the inner half and its exit in the outer half of said circuit, and means to connect said pump to an input power structure; a first stator situated in the outer half of said circuit with an interrupted space between its entrance and said pump exit; a second stator situated in the inner half of said circuit with an interrupted space between its exit and said pump entrance; a third stator interposed between said second stator exit and said pump entrance; reaction structure means to associate said stators with a stationary support structure to therewith render each of said stators firm against backward rotation, said reaction structure means including one-way device means arranged to permit forward rotation operative to render each one of said stators ineffective to vectorially reduce the moment of momentum of circulating fluid, said first stator being thereby and wherefore forwardly rotable relative to said third stator; a first turbine interposed between said pump exit and said first stator entrance; a second turbine situated with its entrance adjacent to the exit of said first stator and its exit adjacent to the entrance of said second stator; driven structure means to associate said turbines with an output power shaft to therewith afford, for each of said turbines, restraint of forward rotation for the conversion and transmission of energy to said output shaft; and, the relationship of circulation path areas in which the average of the exit circulation path area of said third stator and that of said second turbine is 0.60 to 0.90 of the exit circulation path area of said first stator.

49. The combination defined in claim 48 in which said reaction structure means includes: a reaction shaft and a one-way device arranged to connect said third stator with said stationary support structure and to therewith prevent backward rotation and permit forward rotation of said third stator; a one-way device adapted to prevent backward rotation and to permit forward rotation of said second stator relative to said reaction shaft; and, a core situated one-way device operative for said first stator to prevent backward rotation relative to one, and to permit forward rotation relative to both, of said second and said third stators.

50. In a hydrodynamic torque converter drive having bladed-members, one pump, two stators, and two turbines, arranged in spaced relationship in a toroidal circuit for fluid recirculation, the combination comprising: a pump situated with its entrance in the inner half and its exit in the outer half of said circuit, and means to connect said pump to an input power structure; a first stator situated in the outer half of said circuit with an interrupted space between its entrance and said pump exit; a second stator situated in the inner half of said circuit with its exit adjacent to said pump entrance; reaction structure means to associate said stators with a stationary support structure to therewith render each of said stators firm against backward rotation, said reaction structure means including one-way device means arranged to permit forward rotation operative to render each one of said stators ineffective to vectorially reduce the moment of momentum of circulating fluid, said first stator being thereby and wherefore forwardly rotable relative to said second stator; a first turbine interposed between said pump exit and said first stator entrance; a second turbine situated with its entrance adjacent to the exit of said first stator and its exit adjacent to the entrance of said second stator; driven structure means to associate said turbines with an output power shaft to therewith afford, for each of said turbines, restraint of forward rotation for the conversion and transmission of energy to said output shaft; and, entrance and exit features of at least one of said stators correlated and related to the environment as set forth in the ensuing equation, wherein the respective environment for each so particularized stator is partially expressed by features of the nearest preceding one of said turbines $$\frac{R_{ptx}}{R_{sn}}\left[2\pi N_t' R_{ptx}+\frac{Q'}{A_{ptx}}\tan B_{ptx}\right]\left[1-\left(\frac{R_{sn}}{R_{sx}}\right)^2\right]-$$

$$\left[\frac{Q'}{A_{sn}}\tan B_{sn}-\frac{R_{sn}}{R_{sx}}\frac{Q'}{A_{sx}}\tan B_{sx}\right]=0\pm 0.3\frac{Q'}{A_{sn}}$$

in which, $R_{ptx}$, $R_{sn}$ and $R_{sx}$ are the design radii, ft., $A_{ptx}$, $A_{sn}$ and $A_{sx}$ are the circulation path areas, sq. ft., $B_{ptx}$, $B_{sn}$ and $B_{sx}$ are the blade angles, respectively in each grouping, of said preceding turbine exit, of the particular stator entrance, and of the particular stator exit, and, for wide-open throttle input power operation, $N_t'$ is for said preceding turbine a rotational speed, R. P. S., which is 10 to 20 per cent faster than the coupling point speed thereof, and $Q'$ is the rate of fluid circulation, cu. ft. per sec., concurrent with $N_t'$.

51. The combination defined in claim 50 in which said reaction structure means includes: a reaction shaft and a one-way device arranged to connect said second stator with said stationary support structure and to therewith prevent backward rotation and permit forward rotation of said second stator; and, a core situated one-way device adapted to prevent backward rotation and to permit forward rotation of said first stator relative to said second stator.

52. The combination defined in claim 50 and including the relationship of circulation path areas in which the average of the exit circulation path area of said second stator and that of said second turbine is 0.60 to 0.90 of the exit circulation path area of said first stator.

53. The combination defined in claim 50 in which said driven structure means includes means to rotationally unite said first and said second turbines; and, in which the exit features of said first turbine and the entrance features of said second turbine are correlated and related to the environment as set forth in the ensuing equation, wherein, by disposition relative to each other, said first turbine is the preceding turbine, said second turbine is the following turbine, and together are successive turbines $$2\pi N_t' R_{ftn}\left[1-\left(\frac{R_{ptx}}{R_{ftn}}\right)^2\right]-$$

$$\left[\frac{R_{ptx}}{R_{ftn}}\frac{Q'}{A_{ptx}}\tan B_{ptx}-\frac{Q'}{A_{ftn}}\tan B_{ftr}\right]=0\pm 0.3\frac{Q'}{A_{ftn}}$$

in which, $R_{ptx}$ and $R_{ftn}$ are the design radii, ft., $A_{ptx}$ and $A_{ftn}$ are the circulation path areas, sq. ft., and $B_{ptx}$ and $B_{ftn}$ are the blade angles, respectively in each grouping, of said preceding turbine exit, and of said following turbine entrance, and, for wide-open throttle input power operation, $N_t'$ is for said successive turbines a rotational speed, R. P. S., which is 10 to 20 percent faster than the coupling point speed thereof, and $Q'$ is the rate of fluid circulation, cu. ft. per sec., concurrent with $N_t'$.

54. The combination defined in claim 53 and including the relationship of circulation path areas in which the average of the exit circulation path area of said second stator and that of said second turbine is 0.60 to 0.90 of the exit circulation path area of said first stator.

55. In a hydrodynamic torque converter drive having bladed-members, one pump, two stators, and two turbines, arranged in spaced relationship in a toroidal circuit for fluid recirculation, the combination comprising: a pump situated with its entrance in the inner half and its exit in the outer half of said circuit, and means to connect said pump to an input power structure; a first stator situated in the outer half of said circuit with an interrupted space between its entrance and said pump exit; a second stator situated in the inner half of said circuit with its exit adjacent to said pump entrance; reaction structure means to associate said stators with a stationary support structure to therewith render each of said stators firm against backward rotation, said reaction structure means including one-way device means arranged to permit forward rotation operative to render each one of said stators ineffective to vectorially reduce the moment of momentum of circulating fluid, said first stator being thereby and wherefore forwardly rotable relative to said second stator; a first turbine interposed between said pump exit and said first stator entrance; a second turbine situated with its entrance adjacent to the exit of said first stator and its exit adjacent to the entrance of said second stator; driven structure means to associate said turbines with an output power shaft to therewith afford, for each of said turbines, restraint of forward rotation for the conversion and transmission of energy to said output shaft, said driven structure means including means to rotationally unite said first and said second turbines; and, exit features of said first turbine and entrance features of said second turbine correlated and related to the environment as set forth in the ensuing equation, wherein, by disposition relative to each other, said first turbine is the preceding turbine, said second turbine is the following turbine, and together are successive turbines $$2\pi N_t' R_{ftn}\left[1-\left(\frac{R_{ptx}}{R_{ftn}}\right)^2\right]-$$

$$\left[\frac{R_{ptx}}{R_{ftn}}\frac{Q'}{A_{ptx}}\tan B_{ptx}-\frac{Q'}{A_{ftn}}\tan B_{ftn}\right]=0\pm 0.3\frac{Q'}{A_{ftn}}$$

in which, $R_{ptx}$ and $R_{ftn}$ are the design radii, ft., $A_{ptx}$ and $A_{ftn}$ are the circulation path areas, sq. ft., and $B_{ptx}$ and $B_{ftn}$ are the blade angles, respectively in each grouping, of said preceding turbine exit, and of said following turbine entrance, and, for wide-open throttle input power operation, $N_t'$ is for said successive turbines a rotational speed, R. P. S., which is 10 to 20 percent faster than the coupling point speed thereof, and $Q'$ is the rate of fluid circulation, cu. ft. per sec., concurrent with $N_t'$.

56. The combination defined in claim 55 in which said reaction structure means includes: a reaction shaft and a one-way device arranged to connect said second stator with said stationary support structure and to therewith prevent backward rotation and permit forward rotation of said second stator; and, a core situated one-way device adapted to prevent backward rotation and to permit forward rotation of said first stator relative to said second stator.

57. The combination defined in claim 55 and including the relationship of circulation path areas in which the average of the exit circulation path area of said second stator and that of said second turbine is 0.60 to 0.90 of the exit circulation path area of said first stator.

58. In a hydrodynamic torque converter drive having bladed-members, one pump, two stators, and two turbines, arranged in spaced relationship in a toroidal circuit for fluid recirculation, the combination comprising: a pump situated with its entrance in the inner half and its exit in the outer half of said circuit, and means to connect said pump to an input power structure; a first stator situated in the outer half of said circuit with an interrupted space between its entrance and said pump exit; a second stator situated in the inner half of said circuit with its exit adjacent to said pump entrance; reaction structure means to associate said stators with a stationary support structure to therewith render each of said stators firm against backward rotation, said reaction structure means including one-way device means arranged to permit forward rotation operative to render each one of said stators ineffective to vectorially reduce the moment of momentum of circulating fluid, said first stator being thereby and wherefore forwardly rotable relative to said second stator; a first turbine interposed between said pump exit and said first stator entrance; a second turbine situated with its entrance adjacent to the exit of said first stator and its exit adjacent to the entrance of said second stator; driven structure means to associate said turbines with an output power shaft to therewith afford, for each of said turbines, restraint of forward rotation for the conversion and transmission of energy to said output shaft; and, the relationship of circulation path areas in which the average of the exit circulation path area of said second stator and that of said second turbine is 0.60 to 0.90 of the exit circulation path area of said first stator.

59. The combination defined in claim 58 in which said reaction structure means includes: a reaction shaft and a one-way device arranged to connect said second stator with said stationary support structure and to therewith prevent backward rotation and permit forward rotation of said second stator; and, a core situated one-way device adapted to prevent backward rotation and to permit forward rotation of said first stator relative to said second stator.

References Cited in the file of this patent

UNITED STATES PATENTS

| | | |
|---|---|---|
| 1,760,480 | Coats | May 27, 1930 |
| 1,965,518 | Wilson | July 3, 1934 |
| 2,173,604 | Dodge | Sept. 19, 1939 |
| 2,190,830 | Dodge | Feb. 20, 1940 |
| 2,196,585 | Gette | Apr. 9, 1940 |
| 2,235,673 | Dodge | Mar. 18, 1941 |
| 2,258,684 | Lysholm et al. | Oct. 14, 1941 |
| 2,271,919 | Jandasek | Feb. 3, 1942 |
| 2,293,767 | Salerni | Aug. 25, 1942 |
| 2,365,879 | Jandasek | Dec. 26, 1944 |
| 2,440,445 | Jandasek | Apr. 27, 1948 |
| 2,606,460 | Kelley | Aug. 12, 1952 |
| 2,612,754 | Swift | Oct. 7, 1952 |

FOREIGN PATENTS

| | | |
|---|---|---|
| 259,916 | Switzerland | July 1, 1949 |